(12) United States Patent
Yi et al.

(10) Patent No.: US 9,355,078 B2
(45) Date of Patent: May 31, 2016

(54) DISPLAY TIME OF A WEB PAGE

(71) Applicant: Yahoo! Inc., Sunnyvale, CA (US)

(72) Inventors: Xing Yi, Milpitas, CA (US); Jean-Marc Langlois, Menlo Park, CA (US); Scott Gaffney, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 499 days.

(21) Appl. No.: 13/843,433

(22) Filed: Mar. 15, 2013

(65) Prior Publication Data
US 2014/0281858 A1    Sep. 18, 2014

(51) Int. Cl.
G06F 17/22 (2006.01)
G06F 9/445 (2006.01)
G06Q 30/02 (2012.01)

(52) U.S. Cl.
CPC ........ *G06F 17/2247* (2013.01); *G06F 9/44521* (2013.01); *G06F 17/2235* (2013.01); *G06Q 30/0277* (2013.01)

(58) Field of Classification Search
None
See application file for complete search history.

(56) References Cited

U.S. PATENT DOCUMENTS

| | | | | |
|---|---|---|---|---|
| 7,958,234 B2 * | 6/2011 | Thomas et al. | ............... | 709/224 |
| 8,352,917 B2 * | 1/2013 | Wong et al. | ................... | 717/126 |
| 8,356,247 B2 * | 1/2013 | Krassner et al. | .............. | 715/234 |
| 8,365,150 B2 * | 1/2013 | Wong et al. | ................... | 717/126 |
| 8,825,749 B2 * | 9/2014 | Tully et al. | ................... | 709/203 |
| 9,002,895 B2 * | 4/2015 | Doig et al. | ................... | 707/793 |
| 9,047,618 B2 * | 6/2015 | Dharmaji et al. | | |
| 2003/0130982 A1 | 7/2003 | Kasriel et al. | | |
| 2004/0243704 A1 * | 12/2004 | Botelho et al. | .................. | 705/14 |
| 2007/0088607 A1 * | 4/2007 | Feierbach | ...................... | 709/224 |
| 2007/0260519 A1 * | 11/2007 | Sattley et al. | ................... | 705/14 |
| 2007/0299964 A1 * | 12/2007 | Wong et al. | ................... | 709/224 |
| 2008/0059521 A1 | 3/2008 | Hutson et al. | | |
| 2008/0243612 A1 * | 10/2008 | Blinnikka | ........................ | 705/14 |
| 2008/0249905 A1 * | 10/2008 | Wong et al. | ................... | 705/34 |
| 2009/0248494 A1 * | 10/2009 | Hueter et al. | ................... | 705/10 |
| 2009/0271514 A1 * | 10/2009 | Thomas et al. | ............... | 709/224 |
| 2010/0010890 A1 | 1/2010 | Ditkovski et al. | | |
| 2010/0100415 A1 * | 4/2010 | Plummer et al. | ................. | 705/10 |
| 2010/0153544 A1 * | 6/2010 | Krassner et al. | .............. | 709/224 |
| 2011/0083031 A1 * | 4/2011 | Khunteta | .......................... | 714/2 |
| 2011/0307411 A1 | 12/2011 | Bolivar et al. | | |
| 2012/0036022 A1 * | 2/2012 | Dharmaji et al. | .......... | 705/14.69 |
| 2013/0091415 A1 * | 4/2013 | Stilling et al. | ................. | 715/234 |
| 2013/0103740 A1 * | 4/2013 | Tully et al. | .................... | 709/203 |
| 2013/0275951 A1 * | 10/2013 | Dolby et al. | ................... | 717/126 |

OTHER PUBLICATIONS

Notification of Transmittal of the International Search Report and the Written Opinion of the International Searching Authority from corresponding International Application No. PCT/US2014/029468, dated Jun. 27, 2014 (8 total pages).

\* cited by examiner

*Primary Examiner* — Maikhanh Nguyen
(74) *Attorney, Agent, or Firm* — Martine Penilla Group, LLP

(57) ABSTRACT

A method for determining a display time of a page is provided, including the following method operations: receiving a request for page data from a client; in response to the request, sending the page data to the client, the page data defining a page when rendered by the client, the rendered page including a page event module configured to detect and log events in a beacon for transmission, the events being selected from a group comprising a page unhide event, a page hide event, and a page unload event; receiving the beacon from the client; reading events logged in the beacon; and determining a display time of the page based on the events logged in the beacon.

10 Claims, 17 Drawing Sheets

DISPLAY TIME OF A WEB PAGE

BACKGROUND

1. Field of the Invention

The present invention relates to methods and systems for determining display time of a page.

2. Description of the Related Art

At present, Internet users enjoy access to vast quantities of information available through websites and their associated webpages. To provide an even better experience for users, website owners seek to customize the content of the webpages presented to users based on knowledge of the user's preferences, browsing history, and other information specific to each user. By acquiring a better understanding of a given user, a website owner can benefit by being able to provide relevant content and advertising to the user, and the user also benefits by receiving content that he or she is more likely to find engaging.

It is in this context that embodiments of the invention arise.

SUMMARY

Broadly speaking, embodiments of the present invention provide methods and systems for determining the display time of a page. Several inventive embodiments of the present invention are described below.

In one embodiment, a method for determining a display time of a page is provided, including the following method operations: receiving a request for page data from a client; in response to the request, sending the page data to the client, the page data defining a page when rendered by the client, the page data including a page event module configured to detect and log events in a beacon for transmission, the events being selected from a group comprising a page unhide event, a page hide event, and a page unload event; receiving the beacon from the client; reading events logged in the beacon; determining a display time of the page based on the events logged in the beacon; wherein the method is executed by a processor. (Though the present embodiment is described with reference to page data which defines a page when rendered, it will be appreciated that in other embodiments, the page data may define a portion of a page, and may be retrieved as part of that page, e.g. retrieved as part of a page that is primarily retrieved/defined from a $3^{rd}$ party site.)

In one embodiment, the page event module is configured to transmit the beacon upon logging a page unload event.

In one embodiment, determining the display time of the page includes determining a time interval between a page unhide event and a proceeding page hide event or page unload event logged in the beacon.

In one embodiment, the page data further defines an idle timer configured to log an idle event in the beacon and trigger transmission of the beacon after a predefined time period has elapsed from rendering of the page.

In one embodiment, determining the display time of the page includes determining a time interval between a page unhide event and a proceeding idle event logged in the beacon.

In one embodiment, the page defines one or more of an article, a picture, a video, or an advertisement.

In one embodiment, the page unhide event is defined by an HTML5 unhide event; and the page hide event is defined by an HTML5 hide event.

In one embodiment, the page unhide event is defined by a Javascript on Focus event; and the page hide event is defined by a Javascript on Blur event.

In one embodiment, the group further comprises a document object model (DOM) ready event.

In one embodiment, determining the display time of the page includes determining whether a page hide event proceeds a DOM ready event, and if so, then determining a time interval between the DOM ready event and the page hide event.

In one embodiment, the method further includes: tracking an activation of an external link defined on the page, the external link configured to provide access to a second page; and determining a display time of the second page based on the events logged in the tracked activation of the external link and the events logged in the beacon.

In one embodiment, determining the display time of the second page includes determining a time interval between the activation of the external link and a proceeding page unhide event logged in the beacon.

In another embodiment, a method for determining a display time of a page is provided, including the following method operations: receiving a request for page data from a client; in response to the request, sending the page data to the client, the page data defining a page when rendered by the client; tracking page events selected from a group comprising a page unhide event, a page hide event, and a page unload event; determining a display time of the page based on the page events; wherein the method is executed by a processor.

In one embodiment, determining the display time of the page includes determining a time interval between a page unhide event and a proceeding page hide event or page unload event.

In one embodiment, the group further includes an idle event defined when a predefined time period has elapsed from rendering of the page.

In one embodiment, determining the display time of the page includes determining a time interval between a page unhide event and a proceeding idle event.

In one embodiment, the page defines one or more of an article, a picture, a video, or an advertisement.

In one embodiment, the page unhide event is defined by an HTML5 unhide event; and the page hide event is defined by an HTML5 hide event.

In one embodiment, the page unhide event is defined by a Javascript on Focus event; and the page hide event is defined by a Javascript on Blur event.

In one embodiment, the group further comprises a document object model (DOM) ready event.

In one embodiment, determining the display time of the page includes determining whether a page hide event proceeds a DOM ready event, and if so, then determining a time interval between the DOM ready event and the page hide event.

In one embodiment, the group further comprises an external link event defined when an external link defined on the page is activated, the external link configured to provide access to a second page; and the method further includes determining a display time of the second page based on the page events.

In one embodiment, determining the display time of the second page includes determining a time interval between an external link event and a proceeding page unhide event.

In another embodiment, a method for page personalization is provided, including the following method operations: identifying a user operating a client; receiving a request for page data from the client; determining a user profile associated with the user; for each of a plurality of articles, predicting a display time of the article when presented to the user, based on the user profile and features of the article; determining selected articles from the plurality of articles based on the predicted display times; assembling the page data, the page data defining a page when rendered by the client, the rendered page defining references to the selected articles; sending the page data to the client; wherein the method is executed by a processor.

In one embodiment, the predicted display time of the article is defined by an expected time that the article will be actively displayed in a browser session of the user.

In one embodiment, the features of the article include one or more of article key words, article length, or multimedia content.

In one embodiment, determining the user profile includes determining a login status of the user.

In one embodiment, the method further includes: determining a priority order of the selected articles on the page based on the predicted display times of the selected articles.

In one embodiment, the user profile includes one or more of age, gender, or location.

In another embodiment, a method for presenting an advertisement on a page is provided, including: receiving a request for page data from a client; assembling the page data, the page data defining a page when rendered by the client, the rendered page including a content item and an advertisement; sending the page data to the client for rendering on the client; tracking display time of the page; determining a cost to be paid by an advertiser based on the tracked display time of the page; wherein the method is executed by a processor.

In one embodiment, the display time of the page is defined by a time that the page is actively displayed in a browser session of the user.

In one embodiment, the cost to be paid by the advertiser is defined by a cost per unit display time associated with the advertisement and the tracked display time of the page.

In one embodiment, assembling the page data includes selecting the advertisement based at least in part on the cost per unit display time associated with the advertisement.

In one embodiment, tracking display time of the page includes analyzing one or more of a page unhide event, a page hide event, a page unload event.

In one embodiment, the method further includes: accessing a user profile, wherein assembling the page data includes selecting the advertisement based at least in part on the user profile.

In another embodiment, a method for page personalization is provided, including: analyzing attention history of a user, wherein analyzing attention history includes determining dwell times of articles presented to the user, each dwell time of an article defining a duration of time the article was actively displayed during a browser session of the user; determining a user profile of the user based on the analysis of the browsing history; receiving a request for page data from a client associated with the user; retrieving the user profile of the user; selecting one or more articles from a plurality of articles for presentation to the user, based on the user profile and features of the plurality of articles; assembling the page data, the page data defining a page when rendered by the client, the rendered page defining references to the selected articles; sending the page data to the client; wherein the method is executed by a processor.

In one embodiment, determining the user profile of the user includes assigning weights based on the determined dwell times, the weights corresponding to one or more of the features of the plurality of articles.

In one embodiment, the features of the articles include one or more of article key words, article length, or multimedia content.

In one embodiment, retrieving the user profile is in response to determining a logged in status of the user.

In one embodiment, the method further includes: determining a priority order of the selected articles on the page based on the predicted display times of the selected articles.

In one embodiment, the user profile includes one or more of age, gender, or location.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe systems and methods for determining the display time of a page. It will be obvious, however, to one skilled in the art, that the present invention may be practiced without some or all of these specific details. In other instances, well known process operations have not been described in detail in order not to unnecessarily obscure the present invention.

Broadly speaking, conventional methods for understanding a user's web browsing history have relied upon accrual of static events such as clicks or views. However, these types of indicators merely capture individual events occurring at specific time points. In contrast, embodiments in accordance with the present invention are drawn to methods and systems for calculating the amount of time that a page is physically displayed to a user (dwell time). The time-based approach elucidated herein provides a better understanding of a user's interaction with webpages.

Conventional web reporting may include rough approximations of time spent by users on each page. However, these rough approximations are insufficiently granular for purposes of personalization or for advertisement targeting/cost measurement, etc. Accurate determination of dwell time remains a challenge for modern devices capable of running multiple apps, multiple applications, and modern browsers capable of show multiple tabs of pages. Therefore, embodiments of the invention provide methods and systems to enable measurement of fine-granular page-level dwell time, which can be applied for personalization at the article-level (using accurate dwell time of each user on each article to make future article recommendations), or for advertising purposes to accurately measure ad cost.

Whereas prior to the present invention, users' profiles or ad user segments have only been inferred from user click activities (which do not consider the degree of user engagement for each click), by determining accurate measurements of dwell time, it is possible to discover users' interests and build better user interest profiles for article recommendation or ads selection.

Figure 1A:
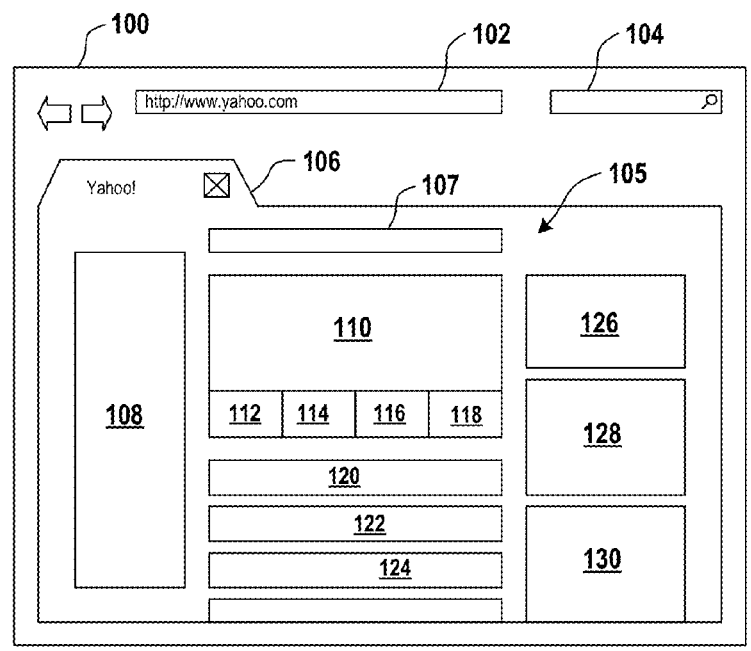
FIG. 1A illustrates a browser window, in accordance with an embodiment of the invention.

FIG. 1A illustrates a browser window, in accordance with an embodiment of the invention. By way of example, the browser window 100 may be that of a typical web browser, including an address bar 102 which can display the address of a currently rendered resource, such as a URL of a webpage. A search bar 104 is provided whereby a user may enter search terms to execute a search from a selected search service. The browser 100 is configured to enable multiple pages to be open within the browser window 100 by accommodating multiple tabs, each of which may display a given page. In the illustrated embodiment, a single tab 106 is currently open in the browser window 100, with a webpage 105 being rendered therein.

It will be appreciated that the webpage 105 can include any of various kinds of content in accordance with various embodiments of the invention. In one embodiment, the webpage 105 is a web portal page which provides access to various articles and other sections of content. One example of a web portal is the Yahoo homepage. By way of example, in the illustrated embodiment, the webpage 105 currently rendered includes a search bar 107 wherein a user can enter search terms and execute a web search. A region 108 of the webpage can be configured to provide access to various sections of the website, such as news, sports, finance, entertainment, or any other sections of the website which can be categorically defined.

In one embodiment, various article previews can be provided with embedded links to pages containing the full versions of the articles. In the illustrated example, a featured article region is defined by a large preview 110 and several smaller preview icons 112, 114, 116, and 118. In one embodiment, when a user hovers over (mouse over) one of the small preview icons, then the large preview 110 is updated to show an extended preview of the same article by the small preview icon that is currently being hovered over. Thus, the small preview icons 112, 114, 116, and 118 are configured to work in conjunction with the large preview 110 to provide increasing amounts of information about a given article to the user. Of course, by clicking on a given small preview icon or by clicking on the large preview 110 when it displays an extended preview for the same article, the user can navigate to another webpage featuring the full version of the article. It should also be appreciated that the ordering of the small preview icons can be adjusted based on various factors including a user profile associated with the user. Furthermore, though four preview icons are shown at any given moment, it will be appreciated that other preview icons can be substituted in the same placement as shown in the illustrated embodiment to allow for presentation of a larger quantity of preview icons and thereby provide access to a larger quantity of articles from the same webpage 105.

In the illustrated embodiment, the webpage 105 additionally includes article previews 120, 122, and 124. Each of these article previews can be configured to provide a short synopsis of an article to which they link, or representative text from the article such as the opening words or sentences of the article. As shown at right on the webpage 105 our various additional content regions 126, 128, and 130, which can be configured to display various kinds of content in accordance with various embodiments of the invention. For example, in one embodiment, the region 126 is configured to display a listing of most popular web searches at present. In one embodiment, the region 128 is configured to display an advertisement which can be selected based on the user profile and other content displayed on the webpage 105. In one embodiment, the region 130 is configured to display the current weather. It will be appreciated that the various regions of the webpage 105 can be configured to show any kind of content which can be rendered on a webpage, including but not limited to, text, images, video, audio, etc.

Figure 1B:
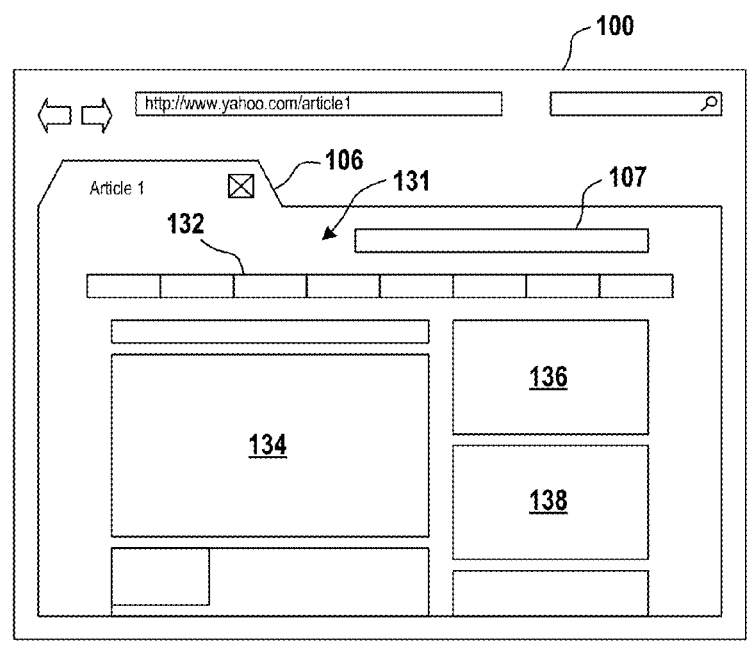
FIG. 1B illustrates a webpage 131 rendered in the tab 106 of the browser window 100.

FIG. 1B illustrates a webpage 131 rendered in the tab 106 of the browser window 100. In the illustrated embodiment, the user has navigated to the webpage 131 by, for example, clicking on a link included in the webpage 105. The link may be embedded in one of the previously described preview icons or article previews, or otherwise included or embedded in content on the webpage 105 shown and described with reference to FIG. 1A. With continued reference to FIG. 1B, the page 131 in one embodiment is configured to display a full version of an article for which the user clicked on a corresponding preview. In the illustrated embodiment, the page 131 is an in-network property, that is, it exists as part of the same domain as the page 105, or is otherwise available through a web domain that is owned by or otherwise controlled by or affiliated with the same entity as that of the page 105. In other embodiments as described in further detail herein, the page 131 may be an off-network property, or a property that does not share a common domain with the page 105.

In the illustrated embodiment, the page 131 may include common features with the page 105, such as the search bar tool 107. A subsection bar 132 may define access to various subsections of content. For example, if the page 131 is a sports page, then the section bar 132 could define various selectable portions which access content for various sports, such as baseball, basketball, football, golf, etc. It should be appreciated that the subsection bar 132 may provide access to subsections of one of the broader sections accessible from the region 108 of page 105.

The page 131 further includes an article 134 which may include various kinds of content such as text in combination with multimedia content such as images, audio, or video content. In one embodiment, the page 131 additionally includes content regions 136 and 138, which may be configured to display various types of content, such as headlines, advertisements, etc.

Broadly speaking, embodiments of the invention are drawn to methods for determining the amount of time that a page is displayed to a user. Throughout the present disclosure, this amount of time shall be referred to as the "display time" or the "dwell time" of a page or other displayed content. In the present instance, the display time of page 105 is the time interval between when the page 105 was first rendered and when page 105's display was replaced by the rendering of the page 131 in the same tab 106 of the browser window 100. The display time of the page 131 accrues from the time the page 131 is loaded in the tab 106 to when another event occurs causing the page 131 to not be shown. For example, if the user pressed the browser "back" button to return to the page 105, then the display time of the page 131 would be the interval of time between the rendering of the page 131 and the subsequent (re)rendering of the page 105. Of course, the total display time of the page 105 would then continue to accrue in addition to the previous display time amount as described earlier.

Figure 1C:
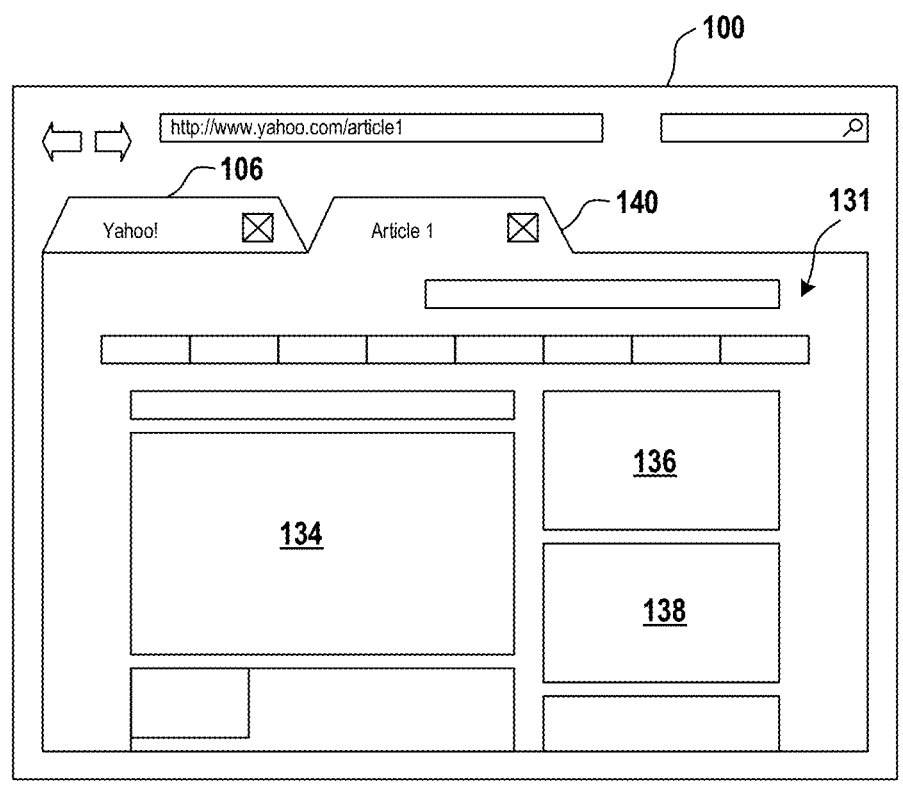
FIG. 1C illustrates the page 131 opened in a new tab 140 of the browser window 100.

Instead of opening a page in a same tab, it will be appreciated that a user may open a new page in a new tab of the same browser window. FIG. 1C illustrates the page 131 opened in a new tab 140 of the browser window 100. The opening of the new tab 140 hides the tab 106 and therefore hides the page 105 displayed in the tab 106. Thus, the display time of the page 105 is the time period from when the page 105 is rendered in the tab 106 to when the tab 140 is opened to display the page 131. And the display time for the page 131 accrues from when the page 131 is rendered in the tab 140. If the user then switches tabs so as to return to tab 106, then the display time for the page 131 will be the time interval between the opening of the tab 140 to display the page 131 and the subsequent hiding of the tab 140 resulting from returning to tab 106. The display time for the page 105 rendered in tab 106 will also continue to accrue the time the tab 106 is reopened for display in the browser window 100.

Figure 2:
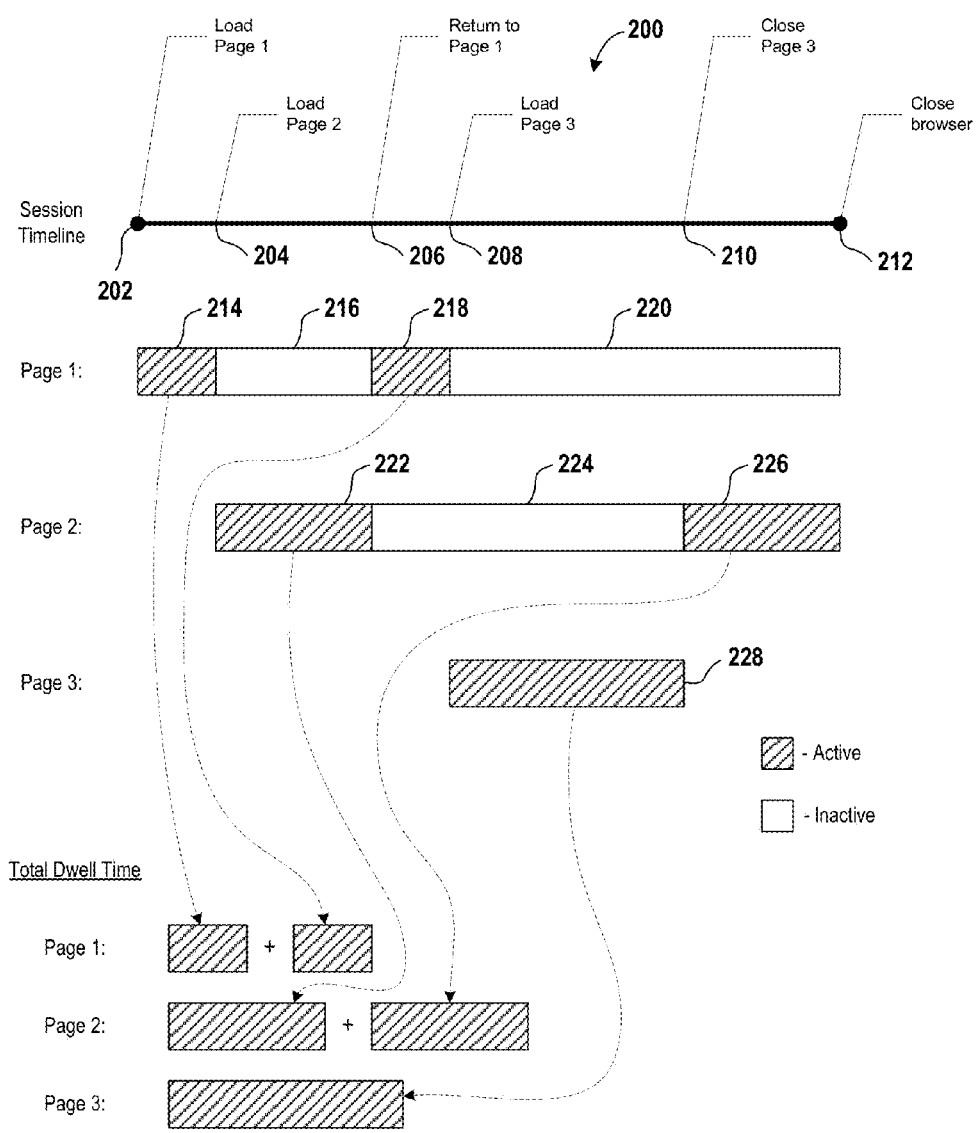
FIG. 2 conceptually illustrates the determination of dwell time for multiple pages having multiple periods of display, in accordance with an embodiment of the invention.

FIG. 2 conceptually illustrates the determination of dwell time for multiple pages having multiple periods of display, in accordance with an embodiment of the invention. A timeline 200 is representative of a user's session interfacing with various pages via a browser. At time 202 the browser is opened and a Page 1 is opened for viewing in a first tab of the browser. At time 204, a Page 2 is loaded in a second tab of the browser for viewing by the user. At time 206, the user returns to viewing Page 1 in the first tab. At time 208, a Page 3 is loaded in a third tab of the browser. At time 210, the third tab containing Page 3 is closed and the user returns to viewing Page 2 in the second tab. At time 212, the browser is closed, thereby closing the first and second tabs and ending the user's browsing session.

Page 1's total time of availability (the time Page 1 was open and available for possible viewing, regardless of whether Page 1 was actually displayed or not) spans the time period from time 202 to time 212, as the first tab was open for the entire time that the browser was open. During time period 214 defined between time 202 and time 204, Page 1 was actively displayed. During time period 216 defined between time 204 and time 206, Page 1 was hidden. Subsequently, during time period 218 defined between time 206 and time 208, Page 1 was displayed again. And during time period 220 defined between time 208 and time 212, Page 1 was hidden. Thus, the total display time for Page 1 is defined by the sum of time periods 214 and 218.

Page 2's total time of availability spans the time period from time 204 to time 212, as the second tab was opened at time 204 and was not closed until the browser was closed at time 212. During time period 222 defined between time 204 and time 206, Page 2 was actively displayed in the second tab. During time period 224 defined between time 206 and time 210, Page 2 was hidden from view. And during time period 226 defined between time 210 and time 212, Page 2 was displayed again as the user returned to viewing the second tab. Thus, the total display time for Page 2 is defined by the sum of the time intervals 222 and 226.

Page 3's total time of availability is the same as its total display time, as Page 3 was opened in the third tab and subsequently the third tab was closed. Thus, the total display time of Page 3 is the time period 228 defined between time 208 and time 210.

It will be appreciated that the time interval 216 during which Page 1 was hidden corresponds to the time interval 222 during which Page 2 was displayed. The time interval 220 during which Page 1 was hidden corresponds to the sum of the time intervals 228 and 226, during which Pages 3 and 2 were displayed, respectively. And the time interval 224 during which Page 2 was hidden corresponds to the sum of the time intervals 218 and 228, during which Pages 1 and 3 were respectively displayed.

Figure 3:
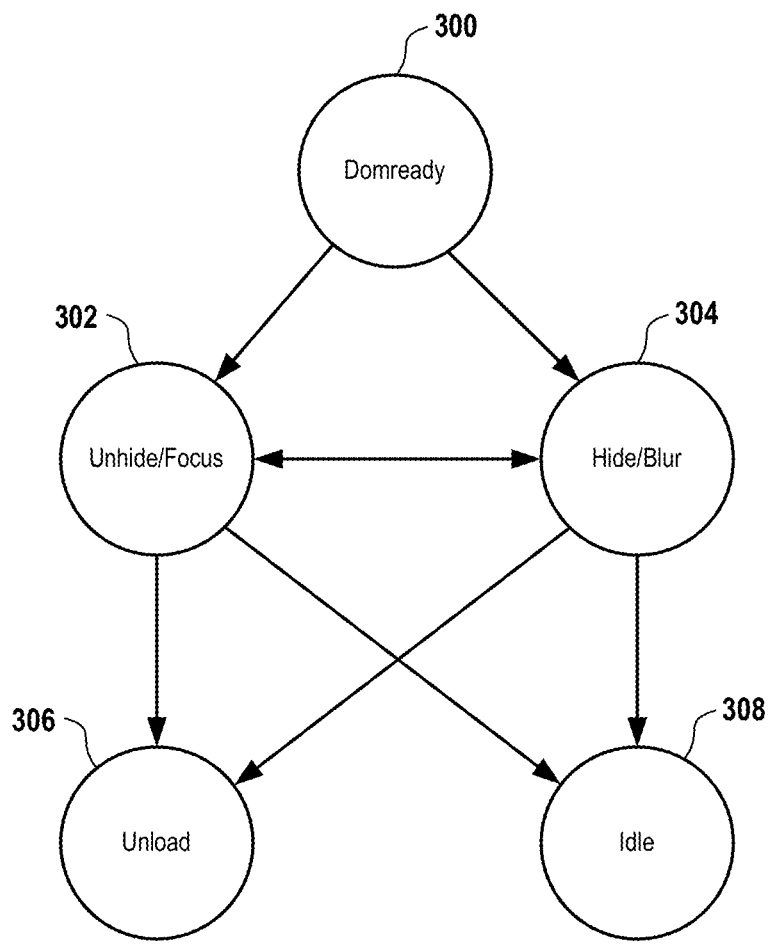
FIG. 3 illustrates a conceptual diagram showing various events for a given page that may be recorded and analyzed to determine the dwell time of the page.

The approximate display time for a page can be determined by logging certain events and analyzing time intervals between these events. Broadly speaking, a log of an event includes the type of event that occurred and a corresponding timestamp indicating the time at which the event occurred. FIG. 3 illustrates a conceptual diagram showing various events for a given page that may be recorded and analyzed to determine the dwell time of the page. When the page is first loaded, its page data is parsed to determine a document object model (DOM). For a given article, the DOM defines the article's container, for which assets are then retrieved to populate the container. Thus, upon completion of the DOM thus a domready event 300 can be recorded, and may function as an approximate time indicative of the start of the display of the page.

Typically, the page will proceed immediately from the domready event 300 to an unhide/focus event 302, which indicates that the page is actively displayed. From the unhide event 302 the page may be hidden when another tab is opened, thereby triggering a hide/blur event 304. If that user returns to viewing the page in the original tab, then another unhide event 302 is recorded. If the page is unloaded, as may occur when the page's tab is closed, when the browser is closed, or when the user navigates to a different page in the same tab, then a page unload event 306 can be recorded just prior to actual unloading of the page. It will be appreciated that the page events may proceed from either of the unhide event 302 or the hide event 304 to the unload event 306.

In one embodiment, an idle timer can be applied that records an idle event 308 when a predefined period of time has elapsed since the initial loading of the page. Thus, the page event state may proceed from either of the unhide event 302 of the hide event 304, to the idle event 308. In another embodiment, the idle timer can be configured to record the idle event 308 when the page has been continuously displayed for a predefined period of time (e.g. following an unhide event).

The recording of the idle event may signal the termination of tracking the various states of the page, to prevent undue tracking of a page in the situation where the user has simply left their computer while leaving the page open in a browser. In various embodiments, the idle timer may be configured for various durations. In one embodiment, the idle timer is configured to trigger an idle event after about 5 to 10 minutes. In other embodiments, the idle timer is configured to trigger an idle event after about less than 5 minutes or after about more than 10 minutes.

Due to the variance in browsers, it may be the case that an unhide/focus event 302 does not always proceed directly from the domready event 300 when the page is loaded. In such situations, it is possible that following the domready event 300, the next event will be a hide/blur event 304.

In one embodiment, the unhide event 302 and the hide event 304 are HTML5 unhide and hide events. In another embodiment, these events are Javascript onfocus and onblur events. In still other embodiments, the unhide event 302 and hide event 304 are defined by any events indicative of the present display or non-display, respectively, of a page, in accordance with the principles described herein.

In one embodiment, the aforementioned events can be stored in a client-side beacon by an event module defined as part of the page data. While it is generally contemplated that the event module will be included as part of page data from the same entity which defines a given web page, it should be appreciated that the event module may also be retrieved independently for inclusion on $3^{rd}$ party sites. By way of example, a page obtained from a $3^{rd}$ party publishing site could include a reference to the page data defining the event module. When the third party page is loaded from the third party publishing site, the reference to the page data defining the event module is also accessed to retrieve and implement the event module as part of the (third party's) page. In this manner, the instrumentation for determining dwell time can be included separately on a third party publisher's site.

The client-side beacon can be transmitted to a server for processing upon the unloading of a page or upon the expiration of the idle timer. The display time of the page can be determined by analyzing the events stored in the beacon. The determination of display time will be discussed in further detail with reference to various examples below.

Figure 4A:
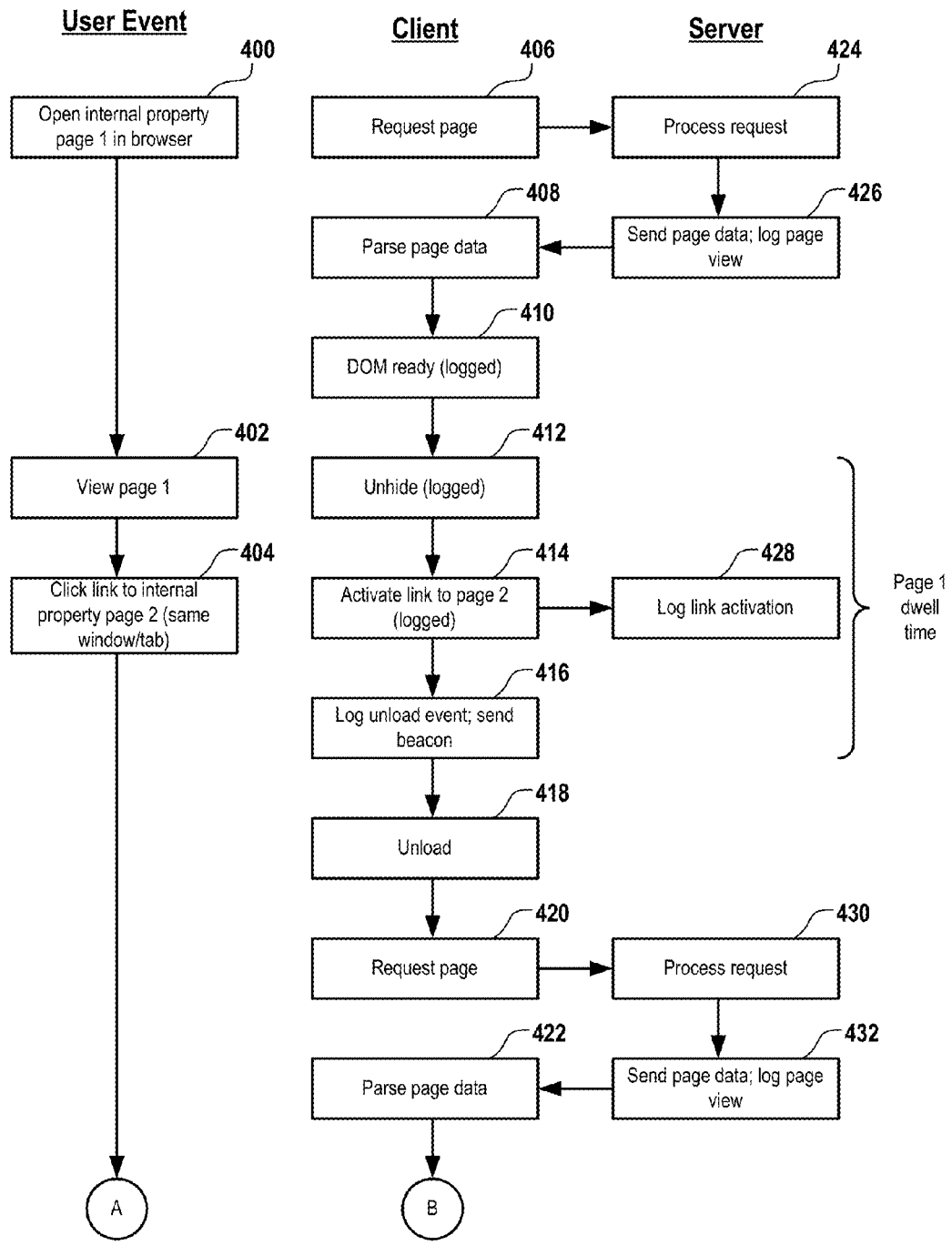
FIGS. 4A, 4B, and 4C illustrate a flow diagram showing events occurring as a user navigates to various pages within a single tab of a browser, in accordance with an embodiment of the invention.
Figure 4B:
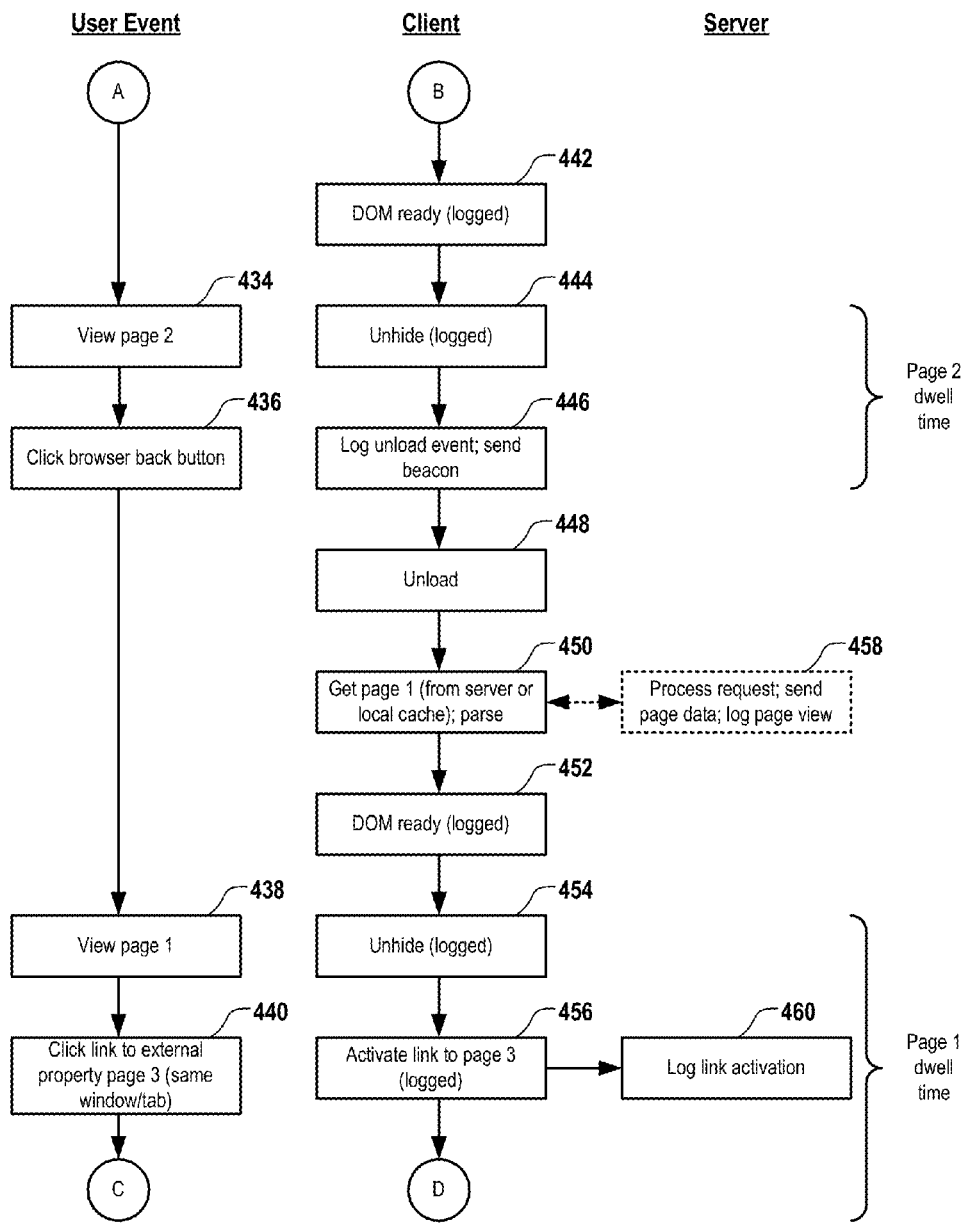
Figure 4C:
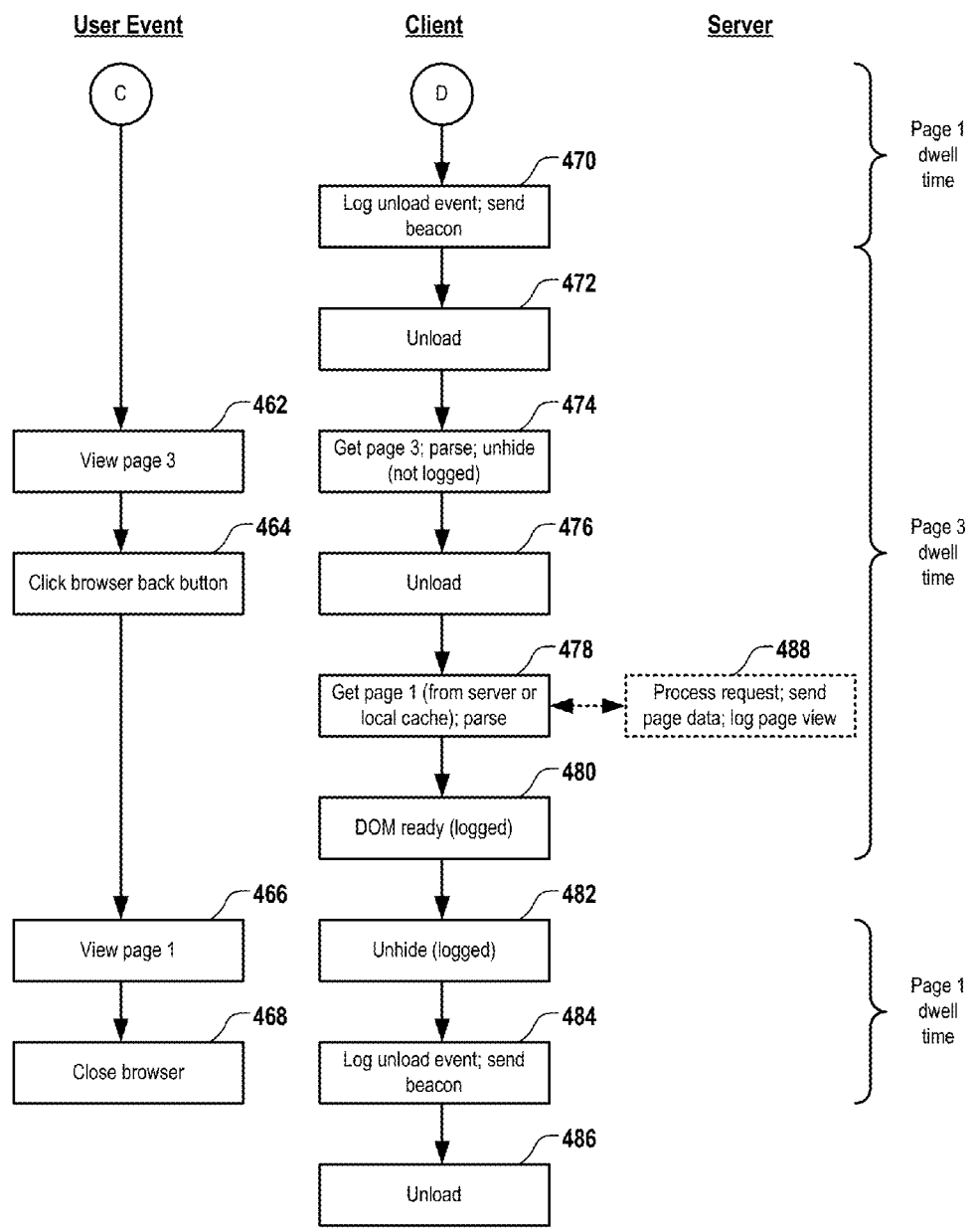

FIGS. 4A, 4B, and 4C illustrate a flow diagram showing events occurring as a user navigates to various pages within a single tab of a browser, in accordance with an embodiment of the invention. Shown at left are events which are defined by actions of the user. Shown in the center are events defined by activities occurring at the client. And shown at right are events defined by activities occurring at the server. It will be appreciated that though a single server is referenced for ease of description, there may be multiple servers which are configured to perform various activities as described herein.

At operation 400, the user opens a browser and requests to access a page 1 in a tab of the browser. To facilitate this, operation 406, the client sends a request for the page to the server. At operation 424, the server processes the request from the client and in operation 426, the server sends page data to the client and logs a page view indicating that the user has requested to view the page. At operation 408, the client browser parses the page data to generate a document object model. At operation 410, a Dom ready event is logged in a client-side beacon. At operation 412, a page unhide event is logged in the client-side beacon. This corresponds to the operation 402 whereby the user views the page 1 in the tab of the browser.

At operation 404, the user clicks on a link to an internal property page 2, so as to open page 2 in the same tab presently occupied by page 1. An internal property page will be understood as in-network or having the same domain as page 1, or otherwise affords the ability to track events via a client-side beacon as described in accordance with embodiments herein. In response to the user's clicking on the link, at operation 414, client activates the link to page 2 and this event is logged in the client side beacon. At operation 428, the link activation may also be logged on the server side. Since page 2 is to be loaded in the same tab as page 1, page 1 will first be unloaded. Therefore, at operation 416, and unload event is logged in the client beacon and the beacon is transmitted to the server for processing. At operation 418, page 1 is unloaded from the tab the browser.

At operation 420, the client browser requests page 2 from the server. At operation 430, the requester page 2 is processed by the server and at operation 432, the server sends the page data to the client and logs a page view event indicating that the client has requested to view page 2. In operation 422, the client browser parses the page data for page 2 and at operation 442, when the document object model is prepared, a Dom ready event is logged in a client-side beacon for page 2. When page 2 is displayed in the tab of the browser, then at operation 444, a page unhide event is logged in the beacon. The display of the page corresponds to the operation 434 whereby the user is able to view page 2 in the tab of the browser.

At operation 436, the user clicks the browser back button so as to navigate from page 2 back to page 1 in the same tab of the browser. Therefore, at operation 446, and unload event is logged in the beacon for page 2 and the beacon is subsequently transmitted to the server for processing. At operation 448, page 2 is unloaded from the browser and at operation 450, page data for page 1 is obtained by the client. It will be appreciated that the page data for page 1 may at this time already be stored in a local cache for ease of retrieval. However, the page data for page 1 may again be obtained from the server as defined at operation 458, whereby the server processes a request for the page data and sends the page data to the client, and may also log a page view event for page 1.

At operation 452, a Dom ready event is detected and logged in another client-side beacon for each one. At operation 454, when page 1 is displayed in the tab of the browser, a page unhide event is logged in the client-side beacon. Corresponding to the page unhide event, at operation 438, the user is able to view page 1 in the browser.

At operation 440, the user clicks on a link to an external property page 3 that is to be loaded in the same tab of the browser thereby displacing page 2. At operation 456, the client browser activates the link to page 3, which is logged as a link activation event in the client-side beacon. Additionally, the link to the external property page 3 can be configured to trigger notification to the server of the link activation, such as via a referral type mechanism or a notification mechanism associated with the external link. Therefore at operation 460, the link activation can be logged at the server. At operation 470 an unload event for page 1 is logged in the client-side beacon and the beacon is then transmitted to the server for processing. At operation 472, page 1 is unloaded from the browser tab.

At operation 474, the client browser obtains page data for page 3 from an external server. The page data is parsed and page 3 is rendered in the browser tab. However, no client-side logging takes place, as page 3 is an out-of-network page that is not configured to log events to a client-side beacon. At operation 462, the user is able to view page 3.

At operation 464, the user again clicks the browser back button to return to page 1. Therefore at operation 476, page 3 is unloaded from the browser tab, and at operation 478 page 1 is obtained by the client. As has been discussed, this may entail retrieval of data from a cache or retrieval from the server, the latter of which facilitates logging of a page view event at the server, as indicated at operation 488. At operation 480, the Dom ready event is logged to another client-side beacon for page 1. At operation 482, a page unhide event is stored to the beacon in response to display of page 1 in the browser tab. This corresponds to operation 466 wherein the user views page 1 in the browser tab.

At operation 468, the user closes the browser. In response, at operation 484 the browser logs an unload event to the client-side beacon, and transmits the client-side beacon to the server for processing. At operation 486, page 1 is unloaded, and the browser is closed.

In the presently described embodiment, the dwell time for page 1 during the user's browser session includes three distinct time intervals. The first interval is defined between the unhide event logged at operation 412 and the unload event logged at operation 416, these events being logged to the first client-side beacon for page 1. The second interval is defined between the unhide event logged at operation 454 and the unload event logged at operation 470, these events being logged to the second client-side beacon for page 1. The third interval is defined between the unhide event logged at operation 482 and the unload event logged at operation 484, these events being logged to the third client-side beacon for page 1. The sum of these three time intervals defines the total dwell time for page 1.

The dwell time for page 2 is defined by the time interval between the unhide event logged at operation 444 and the unload event logged at operation 446, these events being logged to the client-side beacon for page 2. As has been noted page 2 is an in-network property for which a page event mechanism can be configured as part of the page to log events to a beacon for later transmission to the server and subsequent analysis to determine dwell time.

The dwell time for page 3 cannot be determined directly, as page 3 is an off-network property that is not configured to log events to a client beacon as described herein. Therefore, the dwell time for page 3 is approximated from known events. In one embodiment, the dwell time for page 3 is defined by the time interval between the unload event of page 1 logged at operation 470, and the DOM ready event for page 1 logged at operation 480. In this manner, the dwell time for an off-network page is inferred as the time between an unload event and a proceeding load event (e.g. DOM ready).

Figure 5A:
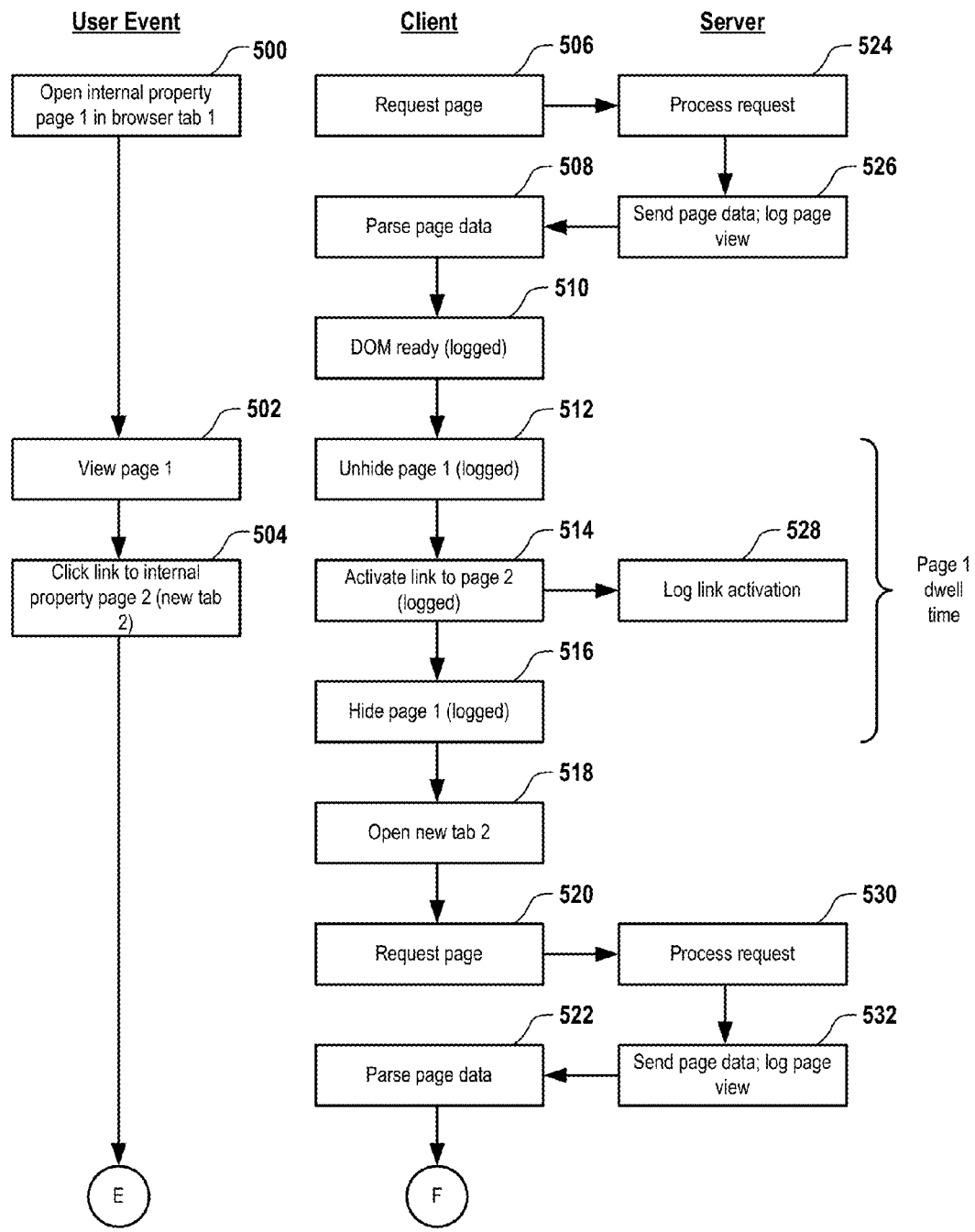
FIGS. 5A, 5B, and 5C illustrate a flow diagram showing events occurring as a user navigates to various pages in various tabs of a browser, in accordance with an embodiment of the invention.
Figure 5B:
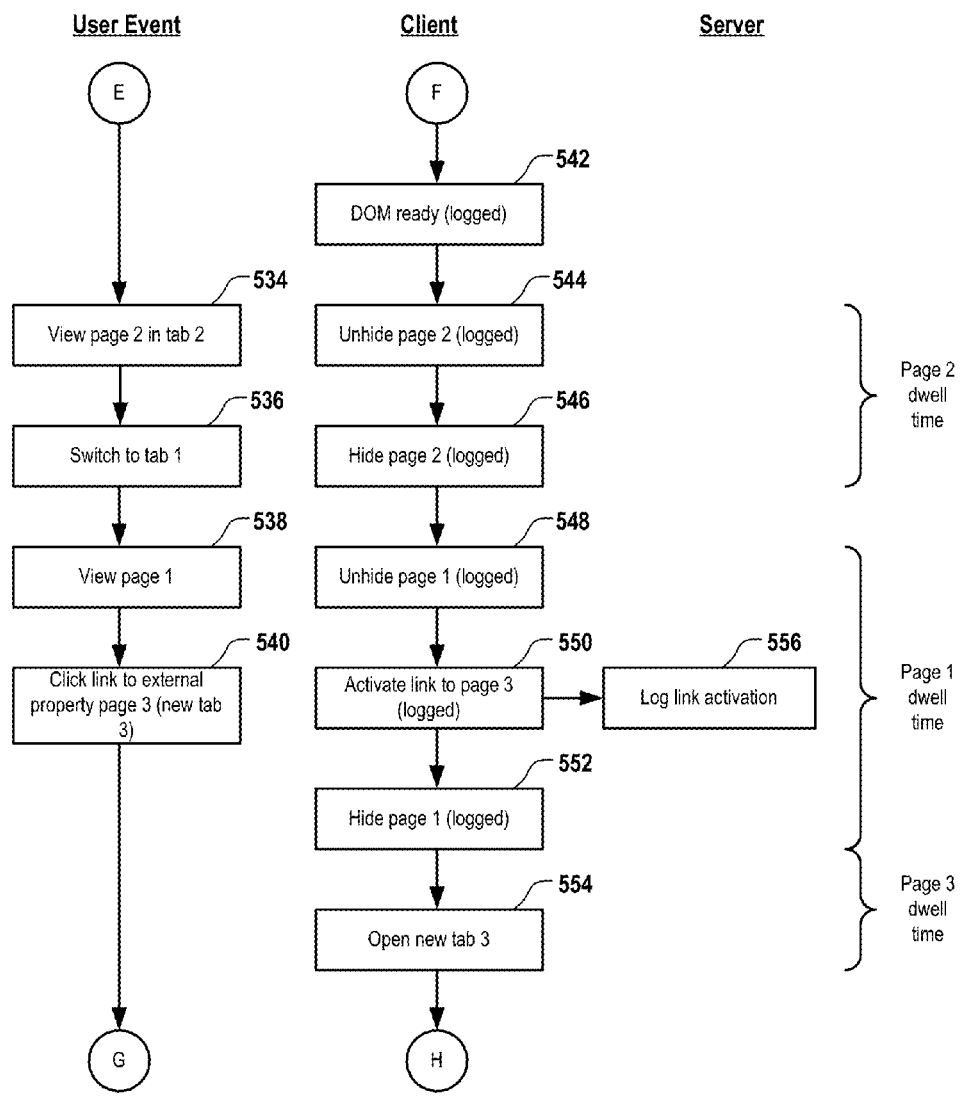
Figure 5C:
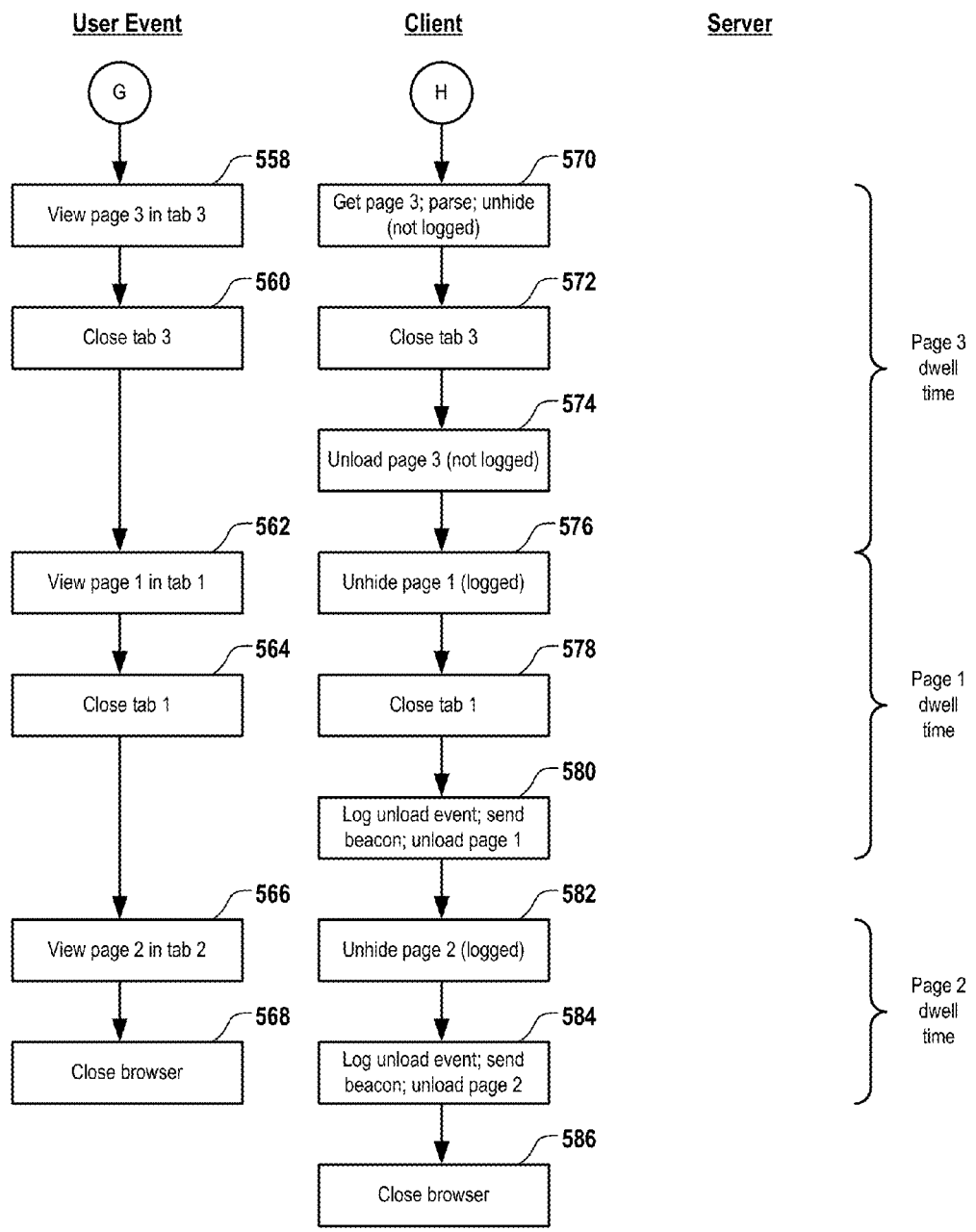

FIGS. 5A, 5B, and 5C illustrate a flow diagram showing events occurring as a user navigates to various pages in various tabs of a browser, in accordance with an embodiment of the invention. At operation 500, the user opens an internal or in-network property page 1 in a first tab of a browser. The client generates a request for page 1 at operation 506, and the server processes the request at operation 524. At operation 526, the server sends the page data for page 1 to the client, and also logs a page view event of page 1.

At operation 508, the client browser parses the page data the prepare the DOM, and at operation 510, a DOM ready event is logged to a client-side beacon for page 1. At operation 512, page 1 is displayed in a first tab of the browser and a page unhide event is logged to the beacon for page 1. Consequently, the user is able to view page 1 at operation 502.

At operation 504, the user clicks on a link to an internal/in-network property page 2 that is to be opened in a second tab of the browser. At operation 514, the link activation is logged to the beacon for page 1, and a corresponding link activation event can be logged on the server-side at operation 528. At operation 516, a page hide event is logged to the client beacon for page 1, and at operation 518 a second tab is opened. At operation 520, the browser requests the page data for page 2, the request being processed by the server at operation 530. At operation 532, the server sends the page data for page 2, and logs a page view event for page 2. At operation 522, the page data for page 2 is parsed to generate a DOM. At operation 542, a DOM ready event is logged in a client-side beacon for page 2. In response to display of page 2 in the second tab of the browser, a page unhide event is logged to the beacon for page 2 at operation 544. The user is able to view page 2 in the second tab of the browser as indicated by operation 534.

At operation 536, the user switches back to viewing the first tab of the browser. Thus, the client logs a page hide event to the beacon for page 2, and in response to display of page 1 in the first tab, the client logs a page unhide event to the beacon for page 1. At operation 538, the user view page 1 in the first tab of the browser.

At operation 540, the user clicks on a link on page 1 to an external property page 3, that is to be opened in a third tab of the browser. The link activation is logged to the beacon for page 1, and at operation 556, the link activation may also be logged on the server side. At operation 552, a page hide event is logged to the beacon for page 1, and the new third tab is opened in the browser at operation 554. At operation 570, page data for page 3 is obtained, parsed, and page 3 is rendered in the third tab of the browser. Correspondingly, at operation 558, the user is able to view page 3 in the third tab of the browser.

At operation 560, the user closes the third tab (e.g. clicking a close button, selecting a menu option, applying a keyboard shortcut, etc.). Therefore, at operation 572 the third tab is closed and at operation 574, page 3 is unloaded. At operation 576, as a result of closing the third tab, the first tab is once again visible, and a page unhide event is logged for the beacon for page 1.

At operation 564, the user closes the first tab. Therefore, at operation 578, the first tab is closed and at operation 580 a page unload event is logged to the page 1 beacon, and the page 1 beacon is then transmitted to the server for processing.

At operation 582, since the first tab is closed, the second tab is displayed and a page unhide event is logged to the beacon for page 2. Thus, the user is able to view page 2 in the second tab of the browser (now the only tab open in the browser). At operation 568, the user closes the browser. In response, at operation 584, an unload event is logged to the page 2 beacon, and the page 2 beacon is transmitted to the server for processing. Page 2 is unloaded from the browser, and at operation 586, the browser is closed.

In the presently described embodiment, the dwell time for page 1 during the user's browser session includes three distinct time intervals. The first interval is defined between the unhide event logged at operation 512 and the hide event logged at operation 516, these events being logged to the first client-side beacon for page 1. The second interval is defined between the unhide event logged at operation 548 and the hide event logged at operation 552, these events being logged to the second client-side beacon for page 1. The third interval is defined between the unhide event logged at operation 576 and the unload event logged at operation 580 these events being logged to the third client-side beacon for page 1. The sum of these three time intervals defines the total dwell time for page 1.

The dwell time for page 2 is defined by two distinct time intervals. The first interval is defined between the unhide event logged at operation 544 and the hide event logged at operation 546, these events being logged to the client-side beacon for page 2. The second interval is defined between the unhide event logged at operation 582 and the unload event logged at operation 584. The sum of these two time intervals defines the total dwell time for page 2. As has been noted, page 2 is an in-network property for which a page event mechanism can be configured as part of the page to log events to a beacon for later transmission to the server and subsequent analysis to determine dwell time.

The dwell time for page 3 cannot be determined directly, as page 3 is an off-network property that is not configured to log events to a client beacon as described herein. Therefore, the dwell time for page 3 is approximated from known events. In one embodiment, the dwell time for page 3 is defined by the time interval between the hide event of page 1 logged at operation 552, and the unhide event for page 1 logged at operation 576. In this manner, the dwell time for an off-network page is inferred as the time between a preceding hide event and a proceeding unhide event.

Figure 6:
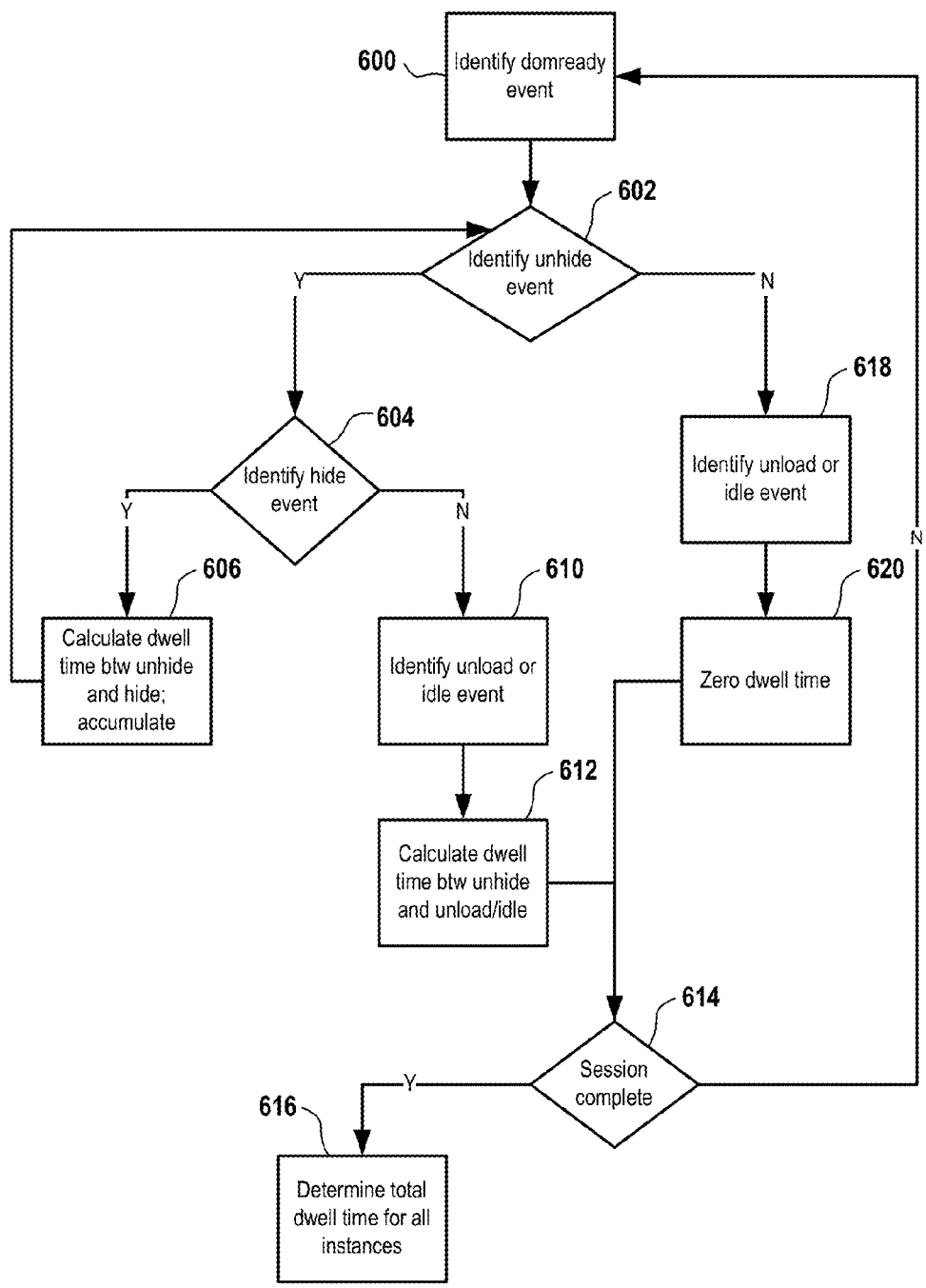
FIG. 6 illustrates a method for calculating dwell time using HTML5 page unhide/hide events, in accordance with an embodiment of the invention.

FIG. 6 illustrates a method for calculating dwell time using HTML5 page unhide/hide events, in accordance with an embodiment of the invention. Broadly speaking, the method can be applied to calculate dwell time based on logged events from one or more beacons for a given page during a browser session. At operation 600, for data from a given beacon, a DOM ready event is identified. At operation 602, it is determined whether a page unhide event is identified as a next event. If yes, then at operation 604 it is determined whether a hide event is identified as the next event. If yes, then at operation 606, dwell time is calculated between the unhide event and the hide event. The method returns to operation 602, wherein it is determined whether the next event is a page unhide event. If yes, and a subsequent hide event is determined at operation 604, then when dwell time is calculated at operation 606, it is accumulated with the calculated dwell time from the previous iteration.

With reference to operation 604, if no hide event is identified as a next event, then at operation 610, an unload event or an idle event is identified. At operation 612, dwell time is calculated between the preceding unhide event and the unload/idle event. At operation 614, it is determined whether the session is complete for the page, that is, whether additional beacon data exists for the page during the same browser session.

With reference to operation 602, if no unhide event is identified as a next event, then at operation 618, an unload/idle event is identified. At operation 620, zero dwell time is determined for the iteration.

If at operation 614 it is determined that the session is complete with respect to the page (no further beacon data to consider for the given page), then at operation 618, the total dwell time for the page is determined by summing the dwell times calculated for each iteration of the method.

Figure 7:
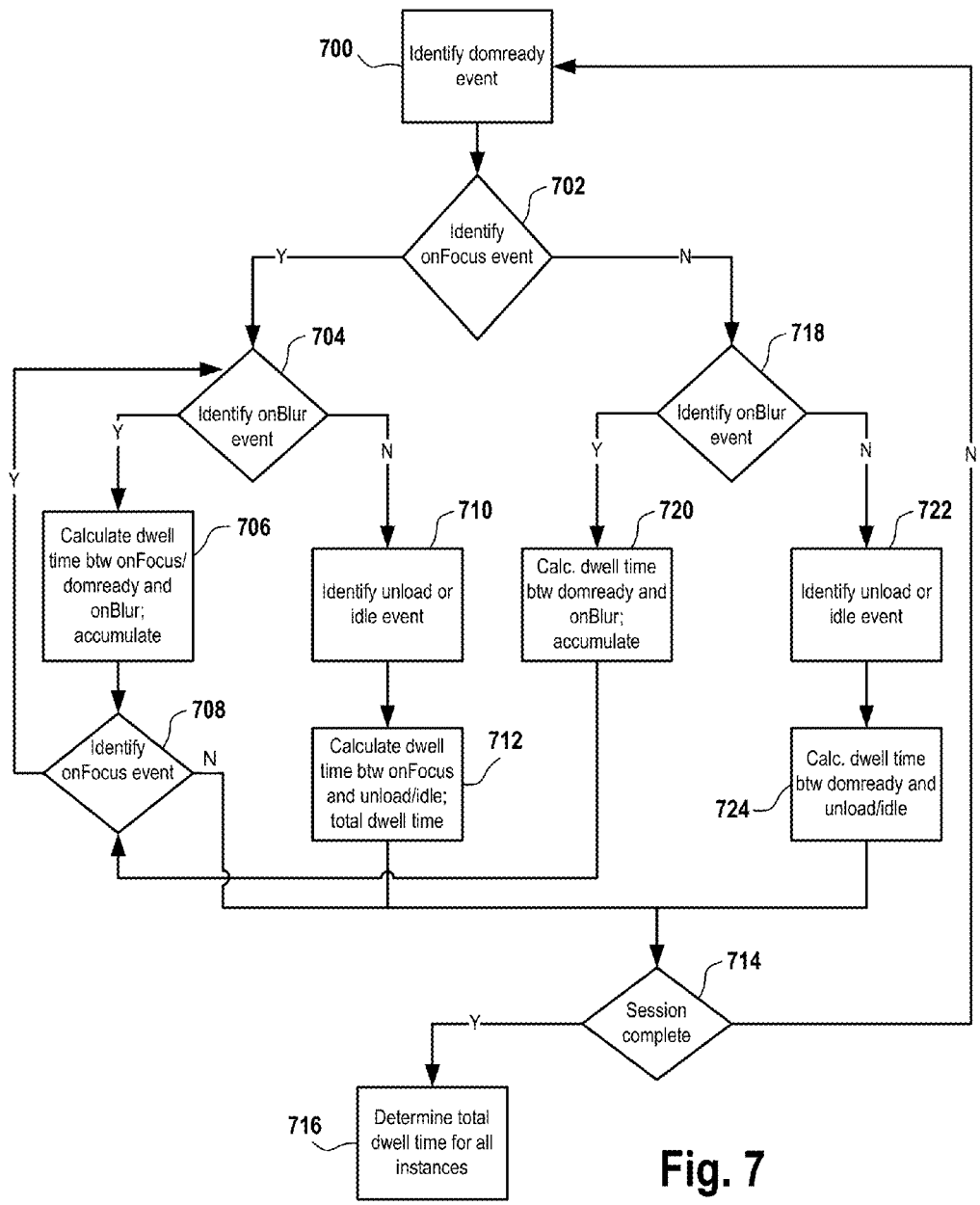
FIG. 7 illustrates a method for calculating dwell time of a page during a browser session using Javascript on Focus/on Blur events, in accordance with an embodiment of the invention.

FIG. 7 illustrates a method for calculating dwell time of a page during a browser session using Javascript on Focus/on Blur events, in accordance with an embodiment of the invention. Broadly speaking, the method can be applied to calculate dwell time based on logged events from one or more beacons for a given page during a browser session. This implementation differs from the previously described HTML5 implementation due to the possibility that an on Focus event may not be immediately logged or may not be logged at all upon the rendering of a page in the browser. This stems from the ways in which some browsers handle Javascript, such that an on Focus event may not be automatically fired when the page container's body is ready (domready event). For example, the user may be required to first interact with the page in some manner, such as by clicking somewhere on the page. Hence, the on Focus event may occur sometime after the domready event, or may not occur at all prior to an on Blur event or an unload or idle event.

At operation 700, a domready event is identified. At operation 702, it is determined whether an on Focus event can be identified as the next event. If yes, then at operation 704, it is determined whether an on Blur event can be identified as the next event. If yes, then for the first iteration at operation 706, the dwell time is calculated as the interval between the on Focus event and the on Blur event, if the on Focus event is closely coupled in time to the domready event, that is the on Focus event does not proceed the domready event by greater than a predefined amount of time (indicating that the on Focus event logging was triggered immediately upon loading of the page container). In the alternative, if the on Focus event does proceed the domready event by greater than the predefined amount of time, then this is interpreted as an indication that the on Focus event logging was not triggered immediately upon the loading of the page container (domready), and therefore the dwell time is calculated as the time interval between the domready event and the on Blur event. Note that this scenario applies to the first iteration through operation 706 following identification of a domready event at operation 700 and identification of an on Focus event at operation 702. For subsequent iterations, the dwell time is calculated simply as the time interval between the on Focus event and the on Blur event.

For example, at operation 708 it is determined whether an on Focus event can be identified as a next event. If yes, then the method returns to operation 704. If not, then at operation 714 it is determined whether the session is complete with respect to the page (no further beacon data for the page to be considered). If not, then the method returns to operation 700 to identify the next domready event. If yes, then at operation 716 the total dwell time for the page during the browser session is determined by summing the dwell times calculated for all beacon instances.

With continued reference to operation 702, if following the domready event, no on Focus event is identified as a next event, then at operation 718 it is determined if an on Blur event can be identified as a next event. If yes, then at operation 720, dwell time is calculated as the time interval between the domready event and the on Blur event. The method then proceeds to operation 708 to determine if a proceeding on Focus event can be identified. If at operation 718 no on Blur event can be identified, then at operation 722, an unload event or an idle event is identified as the next event. At operation 724, the dwell time is calculated as the time interval between the domready event and the unload event or the idle event. It is appreciated that this calculation may overestimate the dwell time of the page. Therefore, if server-side events are available for analysis, they may be utilized to subtract portions of this dwell time for which it is known that the page was not displayed to the user.

Figure 8:
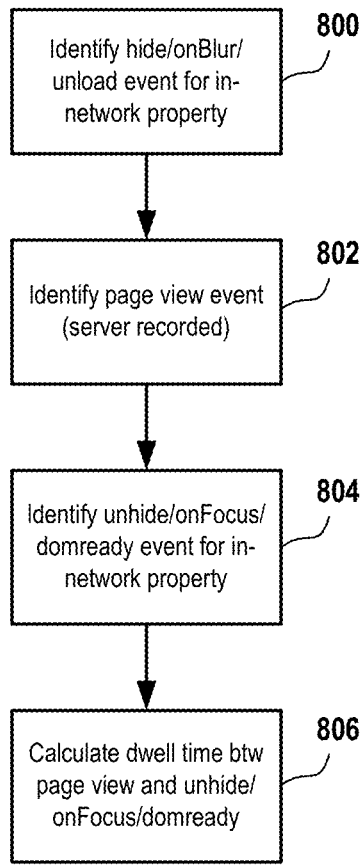
FIG. 8 illustrates a method for calculating the dwell time of an off-network external property page that is reached from an in-network internal property page, in accordance with an embodiment of the invention.

FIG. 8 illustrates a method for calculating the dwell time of an off-network external property page that is reached from an in-network internal property page (e.g. by clicking on an external link on an in-network page), in accordance with an embodiment of the invention. Because the page is external, it is not possible to directly log events occurring on the page. However, because the page is reached from an internal page, certain events are known, and the dwell time of the external page can be inferred from these events.

At operation 800, a hide event or an on Blur event or an unload event is identified for an in-network page. At operation 802, a server-side page view event is identified corresponding to the event identified at operation 800. By way of example, the events may be determined to be corresponding events by determining that their timestamps are close in time to each other (e.g. differ by less than a predefined time period). The server-side page view event can result from a referral type mechanism defined for the external link or other notification mechanism triggered by activation of an external link. At operation 804, an unhide event or an on Focus event or a domready event is identified for an in-network property page. This may result from viewing of the same in-network page as was previously viewed or from viewing a different in-network page. At operation 806, the dwell time for the external page is calculated as the time interval between the server-side page view event and the event identified at operation 804.

It should be appreciated that though the methods for calculating dwell time described with reference to FIGS. 6, 7, and 8 have been described with reference to data logged in client-side beacons, in other embodiments, similar methods employing similar principles may be employed for any set of data including the appropriate events from which dwell time may be calculated as has been described. Furthermore, these methods can be applied in real-time as page events occur and are identified.

Figure 9A:
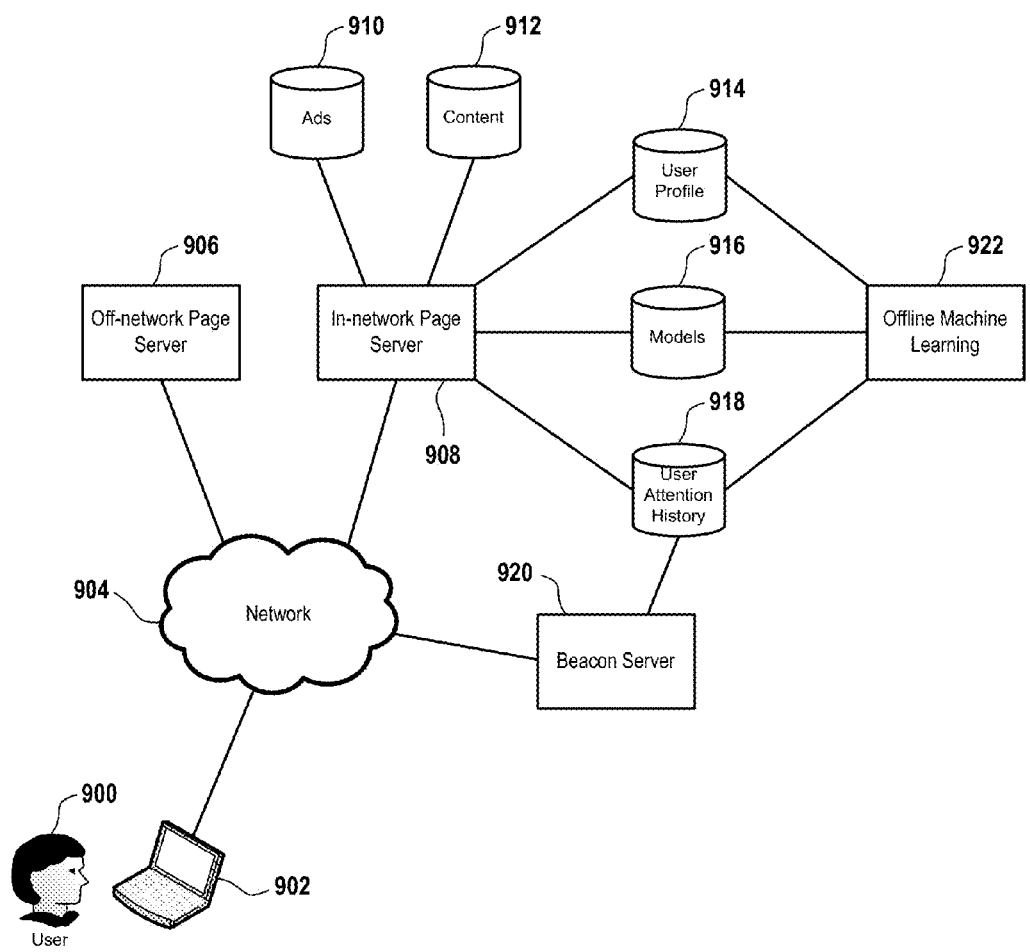
FIG. 9A illustrates a system for serving webpages to a user, in accordance with an embodiment of the invention.

FIG. 9A illustrates a system for serving webpages to a user, in accordance with an embodiment of the invention. In the illustrated embodiment, a user 900 operates a client device 902 that is connected to network 904. Network 904 can include any of various kinds of networks including but not limited to local area networks, wide area networks, the Internet, wireless or wired networks, etc. Broadly speaking, an in-network page server 908 response to requests from the client device 902 to provide page data for rendering pages on the client device. Generally speaking, the page server 908 assembles page data by retrieving content from a content storage 912 and advertisements from an ad storage 910. Content and advertising can be selected based on consideration of various factors as described in further detail herein. In the illustrated embodiment, a user profile is retrieved from a user profile storage 914, and a content recommendation model is retrieved from the model storage 916. The content recommendation model can be configured to determine the probability of various types of user interaction with a webpage based on the user profile and various features of selected content or advertising, and thereby recommend content and advertisement selections for a page are that are optimized to achieve a desired outcome, such as improved user engagement or ad revenue. It will be appreciated that the content recommendation model is configured to determine content and advertising recommendations based at least in part on dwell time.

When a user browses to an off-network property, an off-network page server 906 provides the page data for the off-network web page.

As has been discussed, the in-network webpages may define client-side beacons which are transmitted to a beacon server 920 for processing. The events logged in the client-side beacons are stored to a user attention history 918. Server-side events logged by the page server 908 or other in-network servers are also stored to the user attention history 918. An offline machine learning module 922 analyzes the user attention history 918 and updates the user profiles 914 and the models 916 based on the user attention history. It should be appreciated that such updates are based at least in part on dwell time history. For example, content recommendation models are updated to provide for increased dwell time of selected content.

Figure 9B:
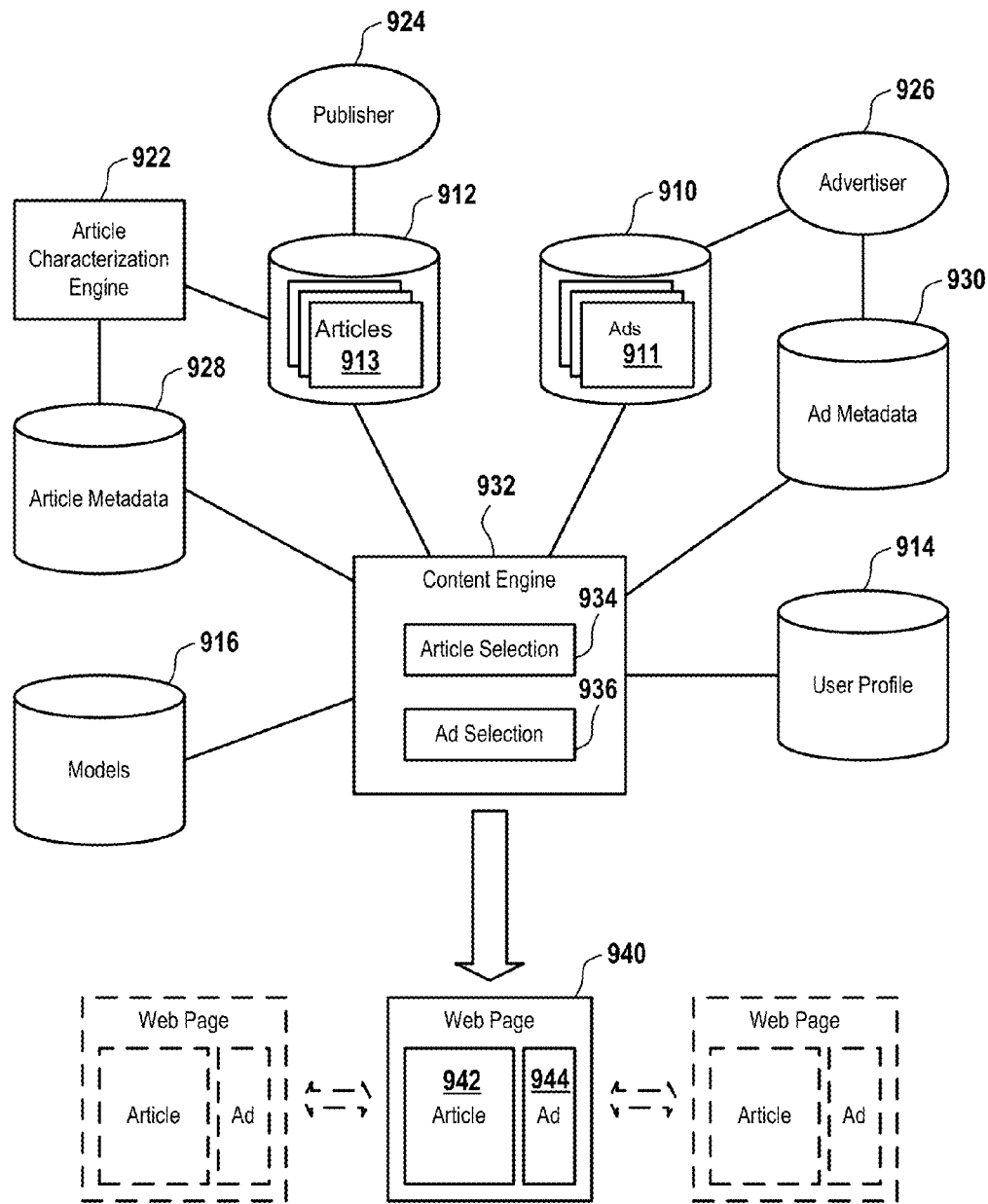
FIG. 9B illustrates a system for content and advertisement selection for a page, in accordance with an embodiment of the invention.

FIG. 9B illustrates a system for content and advertisement selection for a page, in accordance with an embodiment of the invention. In one embodiment, the content storage 912 includes various articles 913. For ease of description, article selection will be specifically described for illustrating methods in accordance with the present invention. However, it will be appreciated that the herein described methods for article selection may also be applied to any other forms of content, including multimedia content. One or more of the articles 913 can be generated by a publisher 924. An articles characterization engine 922 characterizes the articles 913 by identifying features of the articles. For example, this may include identifying keywords contained in the articles, associating tag terms, determining article length, determining article content type, etc. These article features are stored as article metadata in the article metadata storage 928. It will be appreciated that the publisher 924 of an article may also define features of an article for storage as part of the article's metadata.

The ad storage 910 includes various advertisements 911, one or more of which are generated by an advertiser 926. Additionally, the advertiser 926 is able to define various parameters relating to their advertisement which are stored as ad metadata in the ad metadata storage 930. By way of example, the ad metadata may specify a cost structure for the advertisement, such as cost-per-click, cost-per-impression, cost-per-action, cost-per-conversion, etc. Additionally, the ad metadata may specify a cost per unit of display/dwell time, as determined based on methods in accordance with embodiments described herein. (It should be appreciated that this cost structure should not be confused with the conventional "cost-per-time" which refers to a cost paid for a period of time (e.g. typically relatively large periods of time such as weeks or months) during which an ad may be shown an unlimited number of times. It will be apparent that for purposes of the present disclosure, display time or dwell time is defined by a determination of the actual amount of time that a page is physically displayed to one or more users.) Furthermore, time-based pricing tiers can be defined, such as a price for display of an advertisement for less than W total units of time, or a price for display of an advertisement for between X and Y total units of time, or a price for display of an advertisement for greater than Z total units of time. The ad metadata may also specify a target audience which the advertiser wishes to reach with the advertisement, target content with which the advertiser wishes their advertisement to appear, keywords, or other parameters indicating aspects of the advertisement or its intended usage or goals, which may also be tied to costs that the advertiser is willing to pay.

A content engine 932 is provided for selecting content to be presented on a web page 940. The content engine 932 includes an article selection module 934 for selecting one or more articles from the articles 913, and an advertisement selection module 936 for selecting one or more advertisements from the advertisements 911. The content engine optimizes the selection of articles and advertising based on modeled user interactions determined by applying a user profile in conjunction with article metadata and ad metadata to a content recommendation model which determines the optimal content for the web page. In one embodiment, article and ad selection can be optimized based at least in part on predicted article dwell time or advertisement dwell time, so as to provide for increased dwell time of the articles or advertisements presented on the page.

It will be appreciated the user profile may be defined with varying quantities of information and varying degrees of specificity. For example, if the user is logged in, then the user profile may include detailed information relating the user's specified preferences, history, personal information, etc. If the user is not logged in, then the user profile may be more generic, including details which can be determined apart from login, such as ip address location, recent browsing history, etc.

In one embodiment, a user's profile includes various weights which indicate the user's interests in different categories of content. By way of example, categories of content might be categories of news or other types of articles, such as finance, sports, entertainment, local news, weather, etc. A specific weighting for a given category would define a relative level of interest in that category on the part of the user. The weighting for a given category could be determined, at least in part, based on the user's historical dwell time for articles in the given category. Higher dwell times for a given category will result in higher weighting being assigned to the category; whereas lower dwell times will result in a lower weighting. Thus, if a user's dwell times when viewing entertainment articles are generally higher than when viewing finance articles, the user's profile can be configured to have a higher weighting assigned to the entertainment category than the finance category.

It will be appreciated that a user profile may define weights indicating a level of interest for any feature of content which may be defined, and that these weights can be determined based on analyzing a user's dwell time on content having such features. Thus, weights may be assigned for categories, sub-categories, keywords, subjects, styles, content types, or any other content features which can be defined. These user profile weights can be utilized to select content for presentation or recommendation to the user. Broadly speaking, content items can be analyzed and characterized to determine their features, as note above. Content items can then be scored by applying the user profile weighting to their features. Content items having higher scores are therefore more likely to be engaging to the user. Subject to any additional rules or constraints, the highest scoring content items can be presented or recommended to the user.

In the illustrated embodiment, the web page 940 has been configured to present article 942 and advertisement 944. It will be appreciated that the article 942 may be a full version of the article or a preview of the article. As the user navigates to other web pages, the articles and/or the advertisements featured on those pages may likewise be optimized.

Figure 9C:
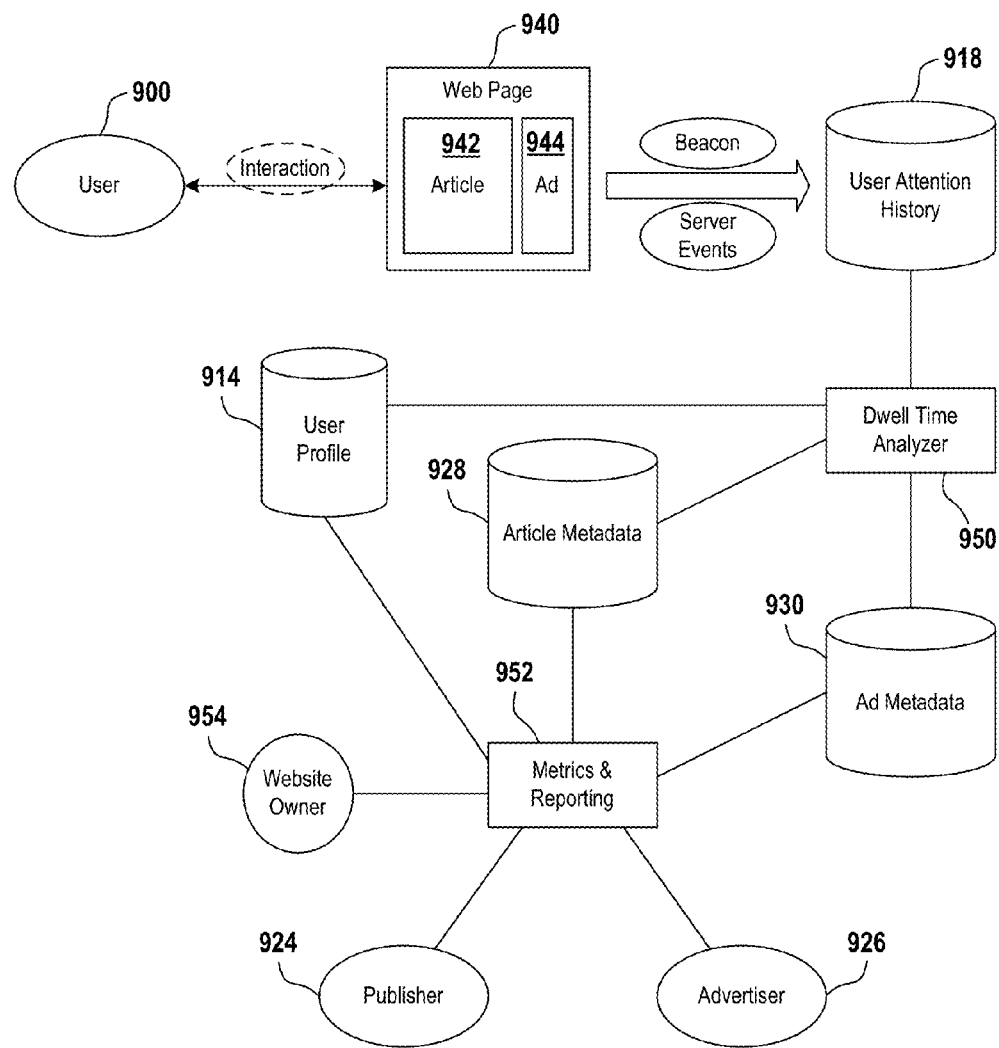
FIG. 9C illustrates a system for providing metrics and reporting including dwell time analysis, in accordance with an embodiment of the invention.

FIG. 9C illustrates a system for providing metrics and reporting including dwell time analysis, in accordance with an embodiment of the invention. As the user 900 interacts with the web page 940, page events are logged in a beacon as has been described, and server events can also be logged. These events are stored as part of the user attention history 918. A dwell time analyzer 950 analyzes the user attention history to determine various dwell time based metrics. Dwell time metrics for specific articles can be determined and stored as part of the article metadata 928. By way of example, such metrics may include, average dwell time per pageview, average dwell time for a given time period or set of users or set of web activity sessions, etc. Similar dwell time metrics for advertisements can be determined and stored as part of the ad metadata 930. Additionally, dwell time metrics for specific users can be determined and utilized to update a user's profile. For example, a user's average dwell times for specific types of content or content having certain features can be determined. Or a user's dwell times for content having certain features can be utilized to assign or update weights for those features, as described above.

It will be appreciated that the aforementioned dwell time metrics will be useful to each of the various parties involved in the provision of web content to users. Thus, a metrics and reporting module 952 provides an interface for the publisher 924 to access and view metrics pertaining to the publisher's articles. The metrics and reporting module 952 also provides an interface for the advertiser 926 to access and view metrics pertaining to the advertiser' advertisements. Further, the metrics and reporting module 952 provides an interface for the website/domain owner 954 to access and view metrics pertaining to users.

Additionally, dwell time metrics can be applied to measure the performance of content recommendation models. Such metrics can include: average of the sum of the dwell time of the clicked articles per page view that generates these clicks; average of the sum of the dwell time for a given time-period, or for a given set of users, or for a given set of web activity sessions; average of the article-averaged dwell time for a given time period, or for a given set of users, or for a given set of web activity sessions.

Figure 10:
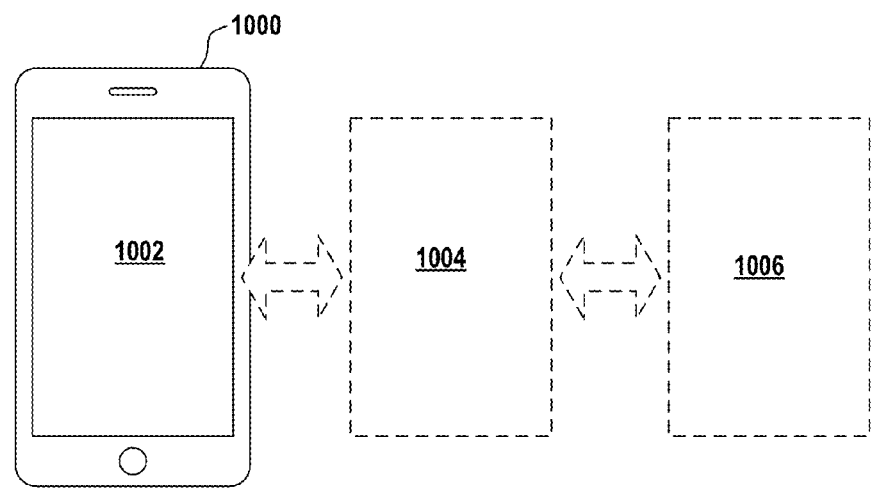
FIG. 10 illustrates a mobile device platform, for which dwell time can be tracked, in accordance with an embodiment of the invention.

It should be appreciated that the presently described methods for determining and applying display/dwell time can be applied to various platforms and classes of devices. FIG. 10 illustrates a mobile device platform, for which dwell time can be tracked, in accordance with an embodiment of the invention. On the mobile device 1000, a page 1002 is displayed. The page 1002 may be displayed in a browser application running on the mobile device 1000. The browser application may support multiple pages open during a session, that can be accessed, for example, by "swiping" to the right or left on a touchscreen of the mobile device 1000. In the illustrated embodiment, pages 1004 and 1006 are presented in an adjacent fashion that may be accessed in this manner. The page events for each of pages 1002, 1004, and 1006 can be tracked and display/dwell times for each of these pages may be determined in accordance with the principles described herein.

The concept of dwell time tracking can also be applied to track the display time of applications on a platform such as mobile devices. When users are multitasking, they may switch between different apps, and the dwell time for each app can be determined. Such dwell time information for apps can be leveraged for partner advertising, in a similar manner to advertising on web pages as has been described. Furthermore, tracking dwell time of various apps can be applied to other platforms in addition to mobile devices.

Figure 11:
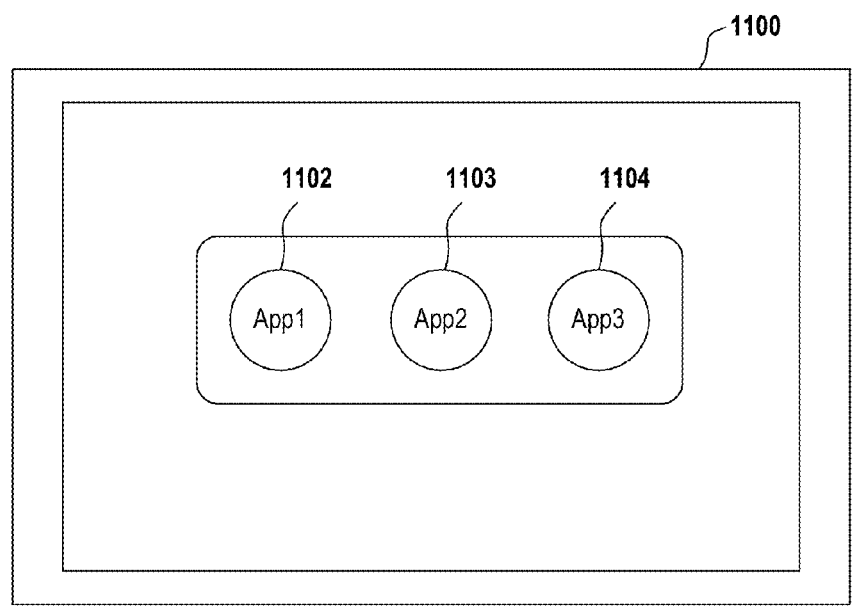
FIG. 11 illustrates a television having various applications available for execution, in accordance with an embodiment of the invention.

FIG. 11 illustrates a television 1100 having various applications 1102, 1103, and 1104 available for execution, in accordance with an embodiment of the invention. It will be appreciated that the dwell time for each of these apps can be determined and utilized in accordance with the principles described herein.

Compared with conventional click-based events, the presently described dwell time concept is a much better indicator of users' real content consumption interests because it directly measures users' engagement time on each target page. Using dwell time based user engagement data enables better evaluation of users' engagement because it shows real user engagement measured by time. Consequently, a better user interest profile can be built.

To appreciate the significance of applying dwell time as a basis for building a user profile, one may consider the example of a user who has clicked on two articles, one being a sports article and one being a fashion article. In the absence of any dwell time information, it is only known that the user clicked on both articles. However, if the dwell time is captured and it is determined that the user interacted with the sports article for five minutes but only spent 10 seconds looking at the fashion article, then it can be inferred that the user was more deeply engaged with the sports article than the fashion article. Based on such information, a higher weight can be assigned to sports interests in the user's profile than to fashion interests, and based on this weighting sports articles will more often be recommended to the user. However, without the dwell time information, in this scenario the user's sports and fashion interests would be equally weighted in the user's profile as determined based on click information alone. Though the foregoing is a simplified scenario, it illustrates the importance of capturing dwell time information as a user engagement metric applied to improve the user interest profile.

Users' dwell time can be used to build offline benchmark data sets for evaluating the performance of personalization models and also for training personalization models. Additionally, users' dwell time can be utilized to online evaluate the performance of different personalization models.

Furthermore, dwell time can be utilized to add time information to traditional advertising user segments. For example, an advertising user audience segment can be defined based at least in part on their dwell time history, such as users who have spent a minimum number of minutes reading articles of a certain type. Dwell time can be used to measure the degree of users' engagement and then define user audience segments based on different degrees of users' engagement.

User's dwell time can further be utilized to quantify the advertising cost for online advertisers. A cost structure based on unit of display/dwell time can be beneficial to both publishers and advertisers, providing more accurate costs and more insightful metrics. Pricing can be tied to specific time-based tiers, and increasing pricing tiers may be configured to have diminishing marginal cost per unit time (e.g. Z dollars for the first hour of display/dwell time, 1.5×Z dollars for the second hour of display time, 1.75×Z dollars for the third hour of display time).

Article dwell time or ad dwell time can be predicted based on user's previous dwell time history for personalization or online advertising price definition purposes.

Further, users' dwell time can be utilized to better measure users' interests on different mobile apps or web apps, so that new apps can be recommended or related ads can be presented.

Embodiments of the invention as herein described may utilize relational database systems as are known in the art. Examples of such database systems include MySQL, Oracle, and Access. Various operations as described above may be effected by performance of an operation via a relational database management system. Such database systems may be embodied in one or more server computers, which may be configured as part of a network of computers.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g. a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium may be any data storage device that can store data, which can thereafter be read by a computer system. Examples of the computer readable medium include hard drives, network attached storage (NAS), read-only memory, random-access memory, FLASH based memory, CD-ROMs, CD-Rs, CD-RWs, DVDs, magnetic tapes, and other optical and non-optical data storage devices. The computer readable medium can also be distributed over a network coupled computer systems so that the computer readable code may be stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overall operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for determining a display time of a page, comprising:
   receiving a request for page data from a client;
   in response to the request, sending the page data to the client, the page data defining a page when rendered by the client, the page data including a page event module that detects and logs events in a beacon for transmission, the events being selected from a group consisting of a page unhide event, a page hide event, and a page unload event, wherein the page data further defines an idle timer that logs an idle event in the beacon and triggers transmission of the beacon after a predefined time period has elapsed from rendering of the page;

receiving the beacon from the client;

reading events logged in the beacon;

determining a display time of the page based on the events logged in the beacon;

tracking an activation of an external link defined on the page, the external link providing access to a second page; and determining a display time of the second page based on the tracked activation of the external link and the events logged in the beacon, wherein determining the display time of the second page includes determining a time interval between the activation of the external link and a proceeding page unhide event logged in the beacon;

wherein the method is executed by a processor.

2. The method of claim 1, wherein the page event module transmits the beacon upon logging a page unload event.

3. The method of claim 1, wherein determining the display time of the page includes determining a time interval between a page unhide event and a proceeding page hide event or page unload event logged in the beacon.

4. The method of claim 1, wherein determining the display time of the page includes determining a time interval between a page unhide event and a proceeding idle event logged in the beacon.

5. The method of claim 1, wherein the page defines one or more of an article, a picture, a video, or an advertisement.

6. The method of claim 1, wherein the page unhide event is defined by an HTML5 unhide event;

wherein the page hide event is defined by an HTML5 hide event.

7. The method of claim 1, wherein the page unhide event is defined by a Javascript onFocus event;

wherein the page hide event is defined by a Javascript onBlur event.

8. The method of claim 1, wherein the group further comprises a document object model (DOM) ready event.

9. The method of claim 8, wherein determining the display time of the page includes determining whether a page hide event proceeds a DOM ready event, and if so, then determining a time interval between the DOM ready event and the page hide event.

10. A method for determining a display time of a page, comprising:

receiving a request for page data from a client;

in response to the request, sending the page data to the client, the page data defining a page when rendered by the client, the page data including a page event module that detects and logs events in a beacon for transmission, the events being selected from a group consisting of a page unhide event, a page hide event, and a page unload event;

receiving the beacon from the client;

reading events logged in the beacon;

determining a display time of the page based on the events logged in the beacon;

tracking an activation of an external link defined on the page, the external link providing access to a second page; and determining a display time of the second page based on the events logged in the tracked activation of the external link and the events logged in the beacon, wherein determining the display time of the second page includes determining a time interval between the activation of the external link and a proceeding page unhide event logged in the beacon;

wherein the method is executed by a processor.

* * * * *